(12) United States Patent
Ecker et al.

(10) Patent No.: US 9,041,810 B2
(45) Date of Patent: May 26, 2015

(54) SYSTEM AND METHOD FOR PREDICTING PATIENT FALLS

(71) Applicant: CareView Communications, Inc., Lewisville, TX (US)

(72) Inventors: Stephen Ecker, The Colony, TX (US); Kyle Brook Johnson, Plano, TX (US); Steven Gail Johnson, Highland Village, TX (US)

(73) Assignee: Careview Communications, Inc., Plano, TX (US)

( * ) Notice: Subject to any disclaimer, the term of this patent is extended or adjusted under 35 U.S.C. 154(b) by 0 days.

(21) Appl. No.: 14/321,427

(22) Filed: Jul. 1, 2014

(65) Prior Publication Data

US 2014/0313340 A1    Oct. 23, 2014

Related U.S. Application Data

(63) Continuation of application No. 12/151,452, filed on May 6, 2008.

(51) Int. Cl.
*G06K 9/00* (2006.01)

(52) U.S. Cl.
CPC ........ *G06K 9/00771* (2013.01); *G06K 9/00348* (2013.01)

(58) Field of Classification Search
CPC ....................... G06K 9/00771; G06K 9/00348
USPC .......................................................... 348/152
See application file for complete search history.

(56) References Cited

U.S. PATENT DOCUMENTS

| 4,608,559 A | 8/1986 | Friedman et al. |
|---|---|---|
| RE32,327 E | 1/1987 | Biba et al. |
| 4,885,795 A | 12/1989 | Bunting et al. |

(Continued)

FOREIGN PATENT DOCUMENTS

| WO | WO0018054 A2 | 3/2000 |
|---|---|---|
| WO | WO02063880 A1 | 8/2002 |

OTHER PUBLICATIONS

AHCPR. (May 1992). Panel for the Prediction and Prevention of Pressure Ulcers in Adults. Pressure Ulcers in Adults: Prediction and Prevention. Clinical Practice Guideline, No. 3. AHCPR Publication No. 92-0047. Rockville, MD: Agency for Health Care Policy and Research, Public Health Service, U.S. Department of Health and Human Services (http://www.ncbi.nlm.nih.gov/bookshelf/br.fcgi?book=hsahcpr&part=A4409).

(Continued)

*Primary Examiner* — Andy Rao
*Assistant Examiner* — Obafemi Sosanya
(74) *Attorney, Agent, or Firm* — Faegre Baker Daniels

(57) ABSTRACT

A patient fall prediction system receives video image frames from a surveillance camera positioned in a patient's room and analyses the video image frames for movement that may be a precursor to a patient fall. In set up phase, the viewpoint of the camera is directed at a risk area associated with patient falls, beds, chairs, wheelchairs, etc. A risk area is defined graphically in the viewport. The patient fall prediction system generates a plurality of concurrent motion detection zones that are situated proximate to the graphic markings of the risk areas. These motion detection zones are monitored for changes between video image frames that indicate a movement. The pattern of detections is recorded and compared to a fall movement detection signature.

16 Claims, 12 Drawing Sheets

(56) References Cited

U.S. PATENT DOCUMENTS

| | | | |
|---|---|---|---|
| 5,343,240 A | 8/1994 | Yu | |
| 5,574,964 A | 11/1996 | Hamlin | |
| 5,798,798 A | 8/1998 | Rector et al. | |
| 5,995,146 A | 11/1999 | Rasmussen | |
| 6,049,281 A | 4/2000 | Osterweil | |
| 6,195,797 B1 | 2/2001 | Williams, Jr. | |
| 6,259,443 B1 | 7/2001 | Williams, Jr. | |
| 6,311,268 B1 | 10/2001 | Chu | |
| 6,317,885 B1 | 11/2001 | Fries | |
| 6,319,201 B1 | 11/2001 | Wilk | |
| 6,323,896 B1 | 11/2001 | Dahmani et al. | |
| 6,323,897 B1 | 11/2001 | Kogane et al. | |
| 6,429,233 B1 | 8/2002 | Oguri et al. | |
| 6,456,320 B2 | 9/2002 | Kuwano et al. | |
| 6,457,057 B1 | 9/2002 | Kageyu et al. | |
| 6,529,233 B1 | 3/2003 | Allen | |
| 6,567,682 B1 | 5/2003 | Osterweil et al. | |
| 6,594,837 B2 | 7/2003 | Khait | |
| 6,646,556 B1 | 11/2003 | Smith et al. | |
| 6,678,413 B1 | 1/2004 | Liang et al. | |
| 6,757,909 B1 | 6/2004 | Maruo et al. | |
| 6,803,945 B1 | 10/2004 | Needham | |
| 6,856,249 B2 | 2/2005 | Strubbe et al. | |
| 6,897,781 B2 | 5/2005 | Cooper et al. | |
| 7,030,764 B2 | 4/2006 | Smith et al. | |
| 7,078,676 B2 | 7/2006 | Smith et al. | |
| 7,110,569 B2 | 9/2006 | Brodsky et al. | |
| 7,378,975 B1 | 5/2008 | Smith et al. | |
| 7,396,331 B2 | 7/2008 | Mack et al. | |
| 7,477,285 B1 | 1/2009 | Johnson | |
| 7,761,310 B2 | 7/2010 | Rodgers | |
| 7,801,328 B2 | 9/2010 | Au et al. | |
| 7,830,962 B1 | 11/2010 | Fernandez et al. | |
| 7,859,564 B2 | 12/2010 | Kelly, III et al. | |
| 8,172,777 B2 | 5/2012 | Goto | |
| 8,471,899 B2 | 6/2013 | Johnson | |
| 8,675,059 B2 | 3/2014 | Johnson et al. | |
| 8,676,603 B2 | 3/2014 | Johnson | |
| 2002/0019984 A1 | 2/2002 | Rakib | |
| 2002/0023297 A1 | 2/2002 | Khait | |
| 2002/0044059 A1 | 4/2002 | Reeder et al. | |
| 2002/0069417 A1 | 6/2002 | Kliger et al. | |
| 2002/0104098 A1 | 8/2002 | Zustak et al. | |
| 2002/0147982 A1 | 10/2002 | Naidoo et al. | |
| 2002/0163577 A1 | 11/2002 | Myers | |
| 2003/0010345 A1 | 1/2003 | Koblasz et al. | |
| 2003/0025599 A1 | 2/2003 | Monroe | |
| 2003/0181830 A1 | 9/2003 | Guimond et al. | |
| 2004/0075738 A1 | 4/2004 | Burke et al. | |
| 2004/0077975 A1 | 4/2004 | Zimmerman | |
| 2004/0105006 A1 | 6/2004 | Lazo et al. | |
| 2004/0189475 A1 | 9/2004 | Cooper et al. | |
| 2006/0024020 A1* | 2/2006 | Badawy | 386/46 |
| 2006/0098865 A1 | 5/2006 | Yang et al. | |
| 2006/0239645 A1 | 10/2006 | Curtner et al. | |
| 2006/0243798 A1 | 11/2006 | Kundu et al. | |
| 2007/0132597 A1 | 6/2007 | Rodgers | |
| 2007/0136102 A1* | 6/2007 | Rodgers | 705/3 |
| 2007/0160293 A1 | 7/2007 | Ishikawa et al. | |
| 2008/0021731 A1 | 1/2008 | Rodgers | |
| 2008/0130961 A1 | 6/2008 | Kinoshita | |
| 2008/0193020 A1 | 8/2008 | Sibiryakov et al. | |
| 2009/0022398 A1 | 1/2009 | Ishikawa et al. | |
| 2009/0070939 A1 | 3/2009 | Hann | |
| 2009/0072142 A1 | 3/2009 | Blitzer | |
| 2009/0119843 A1 | 5/2009 | Rodgers et al. | |
| 2009/0278934 A1 | 11/2009 | Ecker et al. | |
| 2009/0324023 A1 | 12/2009 | Tian et al. | |
| 2010/0052904 A1 | 3/2010 | Noguchi | |
| 2010/0134609 A1 | 6/2010 | Johnson | |
| 2010/0166324 A1 | 7/2010 | Kundu et al. | |
| 2010/0241464 A1 | 9/2010 | Amigo et al. | |
| 2010/0290698 A1 | 11/2010 | Freedman et al. | |
| 2012/0026308 A1 | 2/2012 | Johnson et al. | |
| 2013/0290015 A1 | 10/2013 | Johnson | |
| 2014/0092247 A1 | 4/2014 | Clark et al. | |
| 2014/0168397 A1 | 6/2014 | Greco et al. | |
| 2014/0204207 A1 | 7/2014 | Clark et al. | |
| 2014/0247334 A1 | 9/2014 | Johnson et al. | |
| 2014/0267625 A1 | 9/2014 | Clark et al. | |
| 2014/0288968 A1 | 9/2014 | Johnson | |
| 2014/0313340 A1 | 10/2014 | Ecker et al. | |

OTHER PUBLICATIONS

Chia-Feng Juang, Chia-Ming Chang, Jiuh-Rou Wu, and Demei Lee, Computer Vision-Based Human Body Segmentation and Posture Estimation, Jan. 2009, IEEE Transactions on Systems, Man and Cybernetics—Part A: Systems and Humans, vol. 39, pp. 119-133.

* cited by examiner

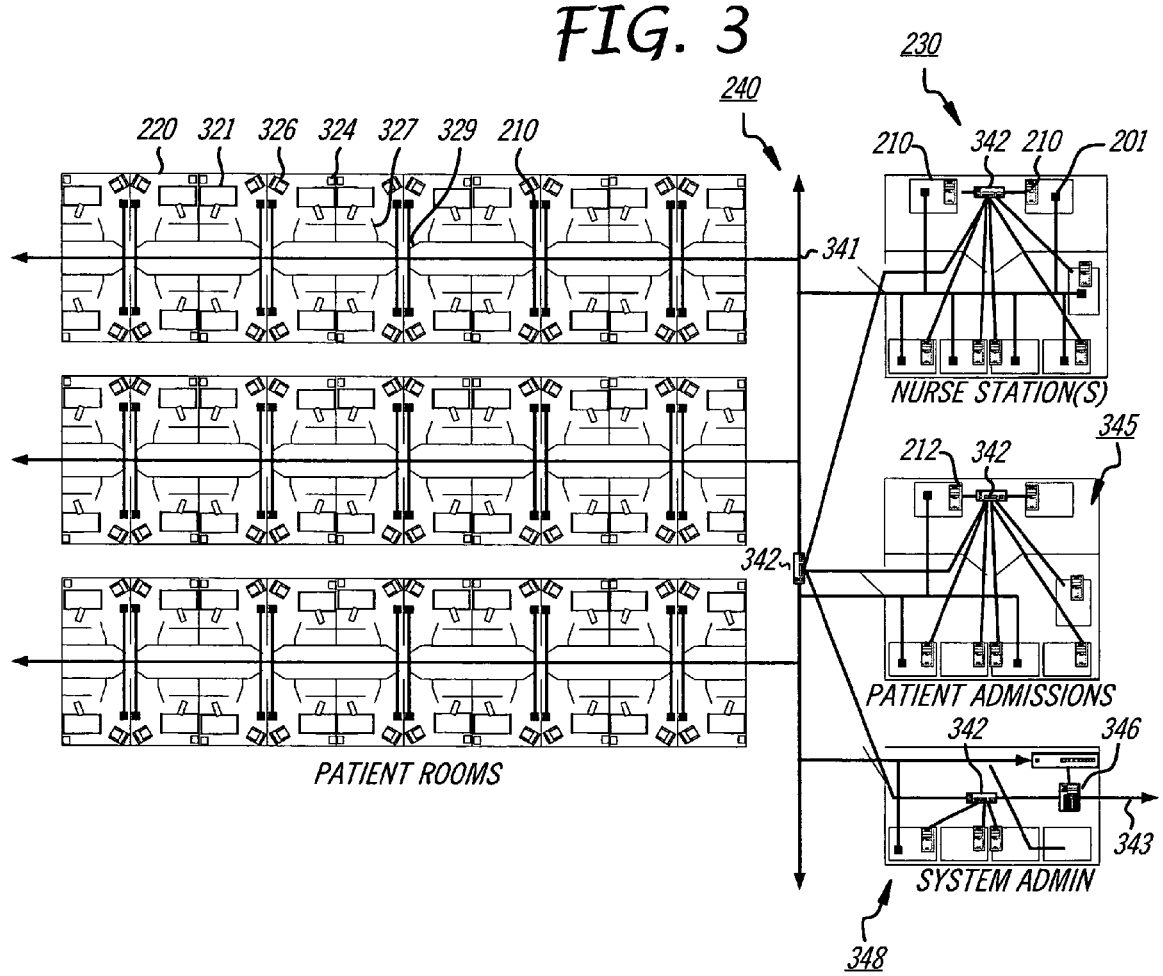

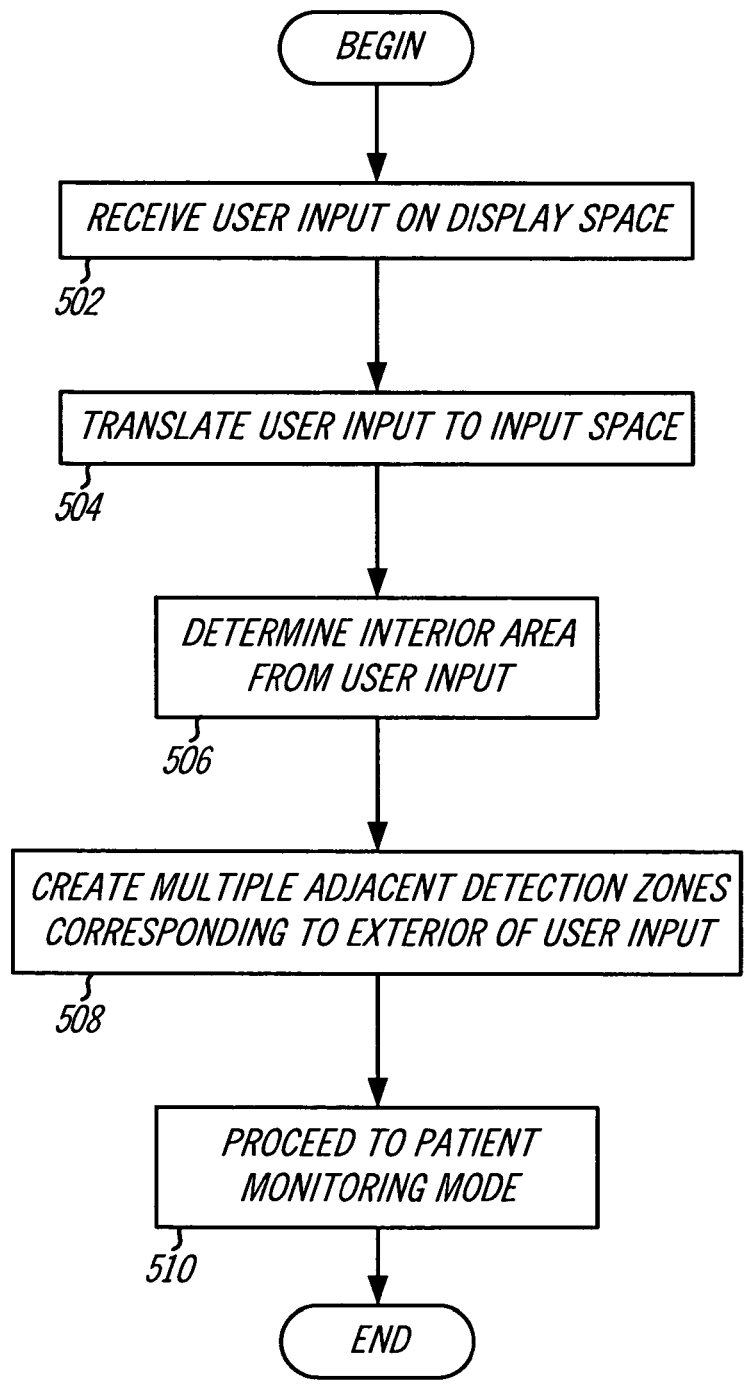

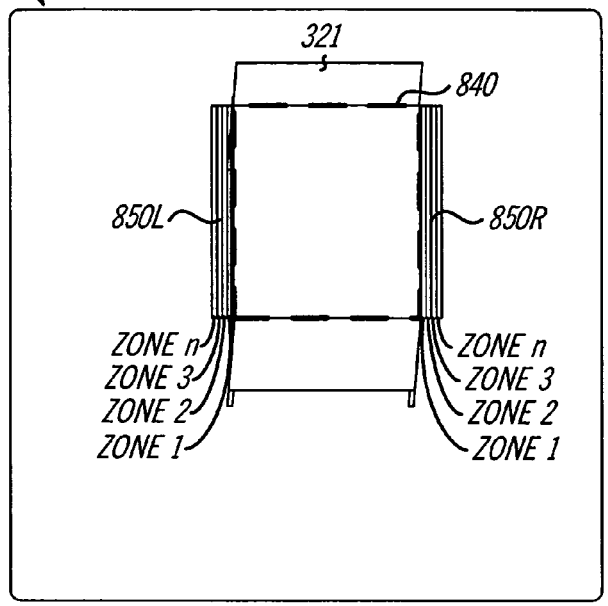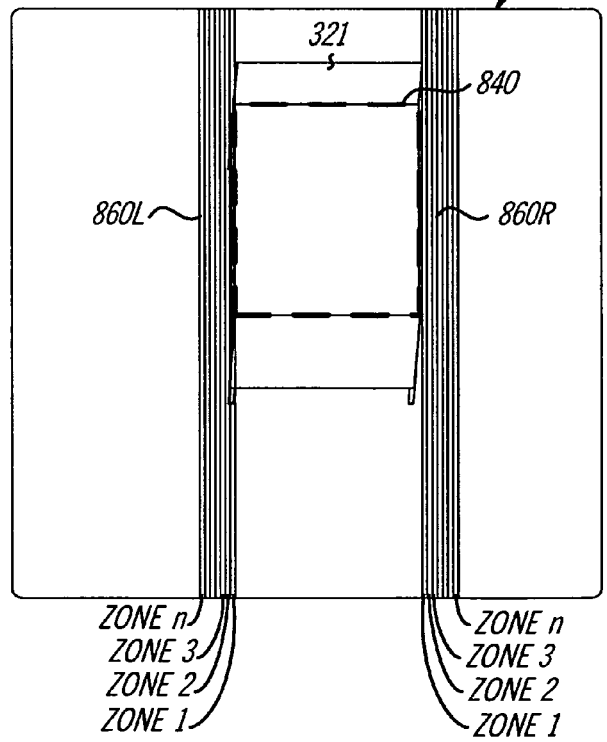

MOTION DIRECTION DETERMINING ROUTINE

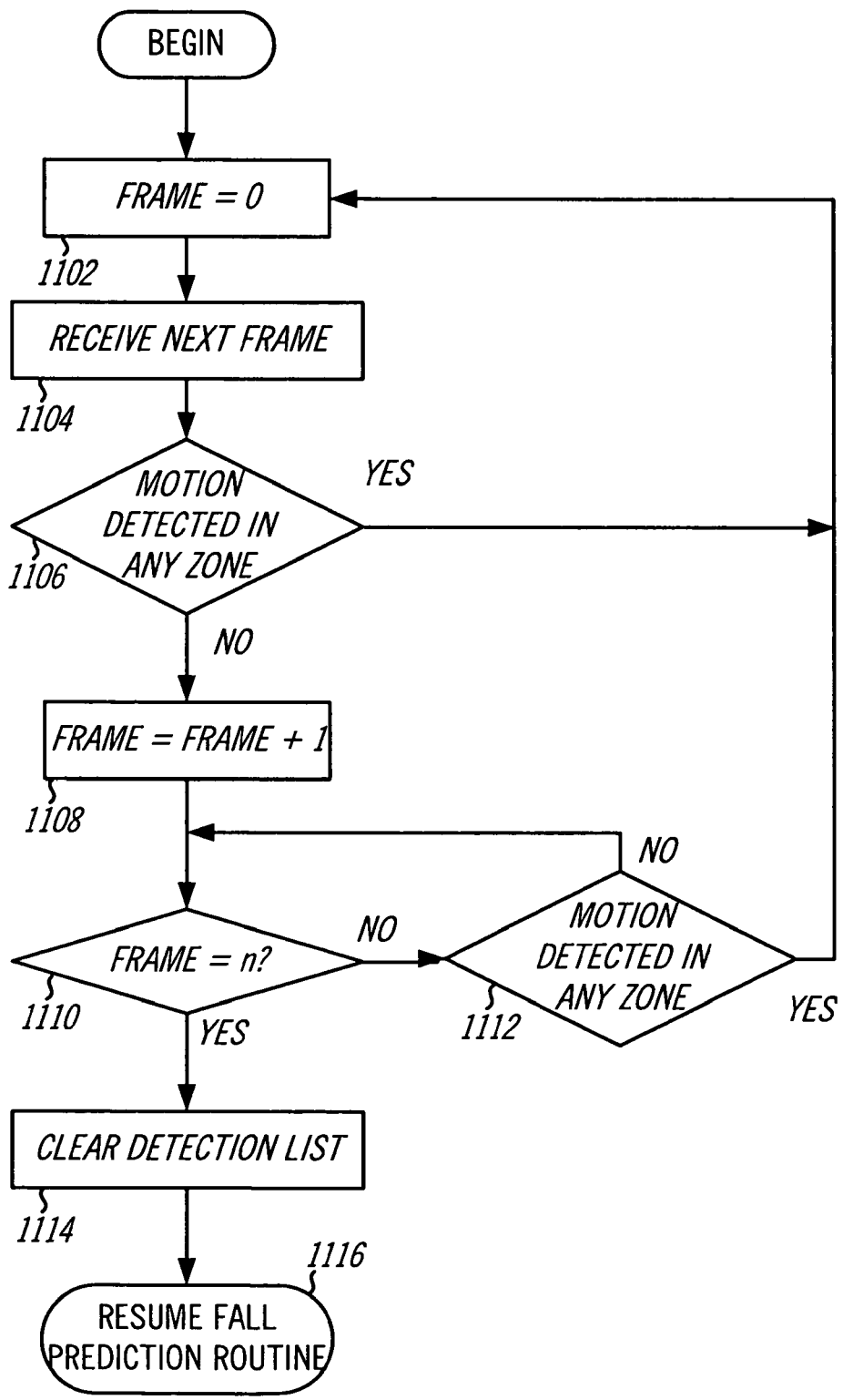

FALL ALERT CONDITION

FALSE ALERT CONDITION

FALSE ALERT ROUTINE

SYSTEM AND METHOD FOR PREDICTING PATIENT FALLS

CROSS-REFERENCE TO RELATED APPLICATIONS

This application is a continuation of U.S. patent application Ser. No. 12/151,452, filed May 6, 2008, to which the benefit of priority is claimed, and which is hereby incorporated herein by reference in its entirety.

This application is related to U.S. patent application Ser. No. 10/735,307 filed Dec. 12, 2003, entitled Non-Intrusive Data Transmission Network for Use in an Enterprise Facility and Method for Implementing, which is assigned to the assignee of the present invention. The above identified application is incorporated by reference herein in its entirety.

BACKGROUND OF THE INVENTION

The present invention relates generally to a patient monitor. More particularly, the present invention relates to a system, method and software program product for analyzing video frames of a patient and determining from motion within the frame if the patient is at risk of a fall.

Fall reduction has become a major focus of all healthcare facilities, including those catering to permanent residents. Healthcare facilities invest a huge amount of their resources in falls management programs and assessing the risk of falls in a particular patient class, location, and care state, along with the risk factors associated with significant injuries. Recent studies have found fall rates at 2.2 to 7.0 (per 1000 patient bed days) in acute care hospitals, 11.0 to 24.9 in long-term care hospitals, and 8.0 to 19.8 in rehabilitation hospitals, with the majority of falls occurring from, or near, the patient's bed, usually by patients who should not ambulate without assistance. The patient's mental status is most often listed as the most common risk factor contributing to falls. Bed falls can account for up to half of all falls in a healthcare facility. The range of injury from all falls has been reported to be at a rate of 29 to 48 percent, with 4 percent to 7.5 percent resulting in serious injury to the patient. The intention of these studies is to improve patient care by providing adequate monitoring programs corresponding to the perceived patient risk and injury. Realistically, however, it is simply impossible to know for sure which patient will fall, and the severity of the injury that may result from any fall. Bed falls have received an extensive amount of scrutiny due to the patient's high expectation of safety and the disproportional potential for severe injury to the patient over other types of falls.

Round the clock patient monitoring by a staff nurse is expensive, therefore, healthcare facilities have investigated alternatives in order to reduce the monitoring staff, while increasing patient safety. In the past, patients at risk of falling from their beds were either physically restrained or sedated, regardless of the patient's mental status. Both of these preventives are now considered to be measures of last resort that are reserved for unruly or incompetent patients. Presently, falls prevention is subdivided into intervention and monitoring techniques. Interventions are aimed at minimizing falls risk and include such measures as ensuring that the patient can reach necessary items from the bed, ensuring that the bed is in a low position and the bed brakes are locked, ensuring that the patient has a manual bed call button within reach for summoning a nurse and that a charge nurse responds (albeit verbally) to every call. Other interventions include the use of half length bedrails to reduce the patient's need to climb over rails to exit the bed and keeping the bedside area uncluttered and obstacle free. Perhaps the most easily implemented intervention is clear instructions from an attending nurse to request assistance prior to leaving the bed.

Healthcare facilities rely on patient monitoring to supplement interventions and reduce the instances of patient falls. Eyes-on monitoring of patients is problematic for two reasons, cost and privacy. Most facilities maximize the patient-to-nurse staffing ratios by care units, e.g., recovery and critical care units have a lower patient-to-nurse staffing ratio than floor bed units, and, typically, bed patients demand greater privacy than those in critical or special care units. For these reasons, patient monitoring has relied on technological solutions rather than nurse monitoring. Note however, that these solutions are alerting devices, used as an aid for patient care and are not a substitute for adequate quality staffing.

Prior art fall prevention monitors include alarms using pressure sensitive pads or position sensitive transmission patches. The first type of fall prevention monitor uses a pressure sensitive pad that senses the patient's body mass. If the sensor detects a change in the patient's body mass, a remotely located alarm is sounded to summon staff. These monitors are extremely adaptable and may be placed in one or more locations on the patient's bed, on the floor adjacent to the bed, on chairs, toilet seats, wheel chairs and almost any other place that a patient may rest. These devices have gained considerable acceptance in the healthcare industry because they are relatively inexpensive, non-intrusive, exhibit a fairly low instance of false alarms and are reliable. These monitors can be used in tandem to more accurately assess the position of a patient, thereby further reducing false alarms. For instance, the system may be configured with one pressure sensitive pad in the bed and under the patient and a second pressure sensitive pad on the floor. Then, the staff will be alerted whenever a patient's weights shifts off of the bed pad and again when the patient's weight is sensed by the floor pad.

Detractors to pressure sensitive fall prevention monitors counter that these types of devices may be more accurately described as "patient fall detectors" than "fall prevention monitors" because they typically alert only after a fall has occurred and the patient's weight has shifted out of the bed. In other words, prior art pressure sensitive fall monitors cannot perceive that the patient is in the process of getting out of bed, only that the patient's weight has left the bed. Additionally, poorly placed pressure sensitive pads may send multiple nuisance alarms that must be responded to and then to reposition the pressure sensitive pad requires that the bed be empty.

More recently, patient position sensitive transmission patches have been introduced that sense the position of a body part and send an alarm if the part is in a "near weight bearing position." The "patch" is a battery powered inclinometer, processing circuitry and a transmitter enclosed in an adhesive patch that is used in conjunction with a wireless receiver and alarm. The patch may be applied to the back of a patient's thigh parallel with the femur. Whenever the patient's thigh is approaching a weight bearing angle, the patch sends an alert signal to the remote receiver and an alarm sounds. These position sensitive transmission patches are relatively inexpensive and can be worn continuously for up to three weeks. The downside is battery life. The transmission patch device is essentially in a sleep mode when the patch is horizontal and consumes relatively little power, however when the patch is oriented off horizontal, the inclinometer and associate electronics are continuously processing measurements. Alert transmissions consume even more battery power.

BRIEF SUMMARY OF THE INVENTION

The present invention is directed to a system, method and software product for detecting motion and correlating that motion to movement signatures that are precursors to a patient fall. The present patient fall prediction system may be implemented in a facility's existing surveillance monitoring system. The system includes at least one surveillance camera positioned in the patient's room for observing the patient. Typically the healthcare professional is stationed remotely from the patient room and monitors the system at the remote. In set up phase, the viewpoint of the camera is oriented toward an area in the room associated with of elevated risk of patient falls, such as a bed, chair, wheelchair or shower. The patient will be located in this area. The healthcare professional observes the room setting on a monitor and identifies an area in the viewport frame that will be monitored for patient falls. This area is typically the origin of patient movement and the general location of the patient in the viewport. Next, the healthcare professionals defines specific areas on the display that are associated with elevated risk for falling, usually by graphically marking these risk areas graphically on the screen. These high risk areas include the edges of a bed or chair, the side of a tub, a shower entry, or even an entryway threshold. Once identified by the professional, the patient fall prediction system monitors high risk areas for motion and correlates patterns of detected motion to known motion detection signatures. Some detection signatures represent general motion that does not correspond to patient falls, while others represent patient fall signatures, that is movement that is a precursor to a patient fall. When a detection pattern correlates to a fall detection signature, a fall alert is immediately transmitted to the healthcare professional at the remote location.

Motion patterns are detected through the use of concurrent detection zones that are delineated adjacent to graphic markings of the risk areas made by the healthcare professional. The purpose of the detections zones is to predict patient falls based on the direction of motion detected across the detection zones. Detection patterns indicating an inward movement toward the patient are not precursors to falls and are usually ignored. Conversely, motion detection patterns indicative of movement away from the origin, outward from the patient, are indicative of a high risk patient movements that may be a precursor to a fall. These outward patient movements are detected as sequential motion across the set of detection zones beginning with the innermost zone, then through the internal detection zones of the set and finally as detected in the outermost detection zone last (i.e., motion is detected chronologically from the innermost motion detection zone to the outermost zone). Once matched to a fall detection signature, a fall alert is immediately transmitted to the healthcare professional.

BRIEF DESCRIPTION OF THE SEVERAL VIEWS OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIG. 3 is a diagram depicting the physical layout and logical topology of a healthcare facility (HCF) as may utilize the present invention;

FIG. 5 is a flowchart of a setup method implementing a patient fall prediction system for detecting patient movements that may be precursors to a fall in accordance with an exemplary embodiment of the present invention;

FIGS. 8A and 8B are diagrams of two possible configurations for motion detection zones in accordance with exemplary embodiments of the present invention;

FIG. 11 is a flowchart of a method for clearing a detection list in accordance with one exemplary embodiment of the present invention;

Figure 1:
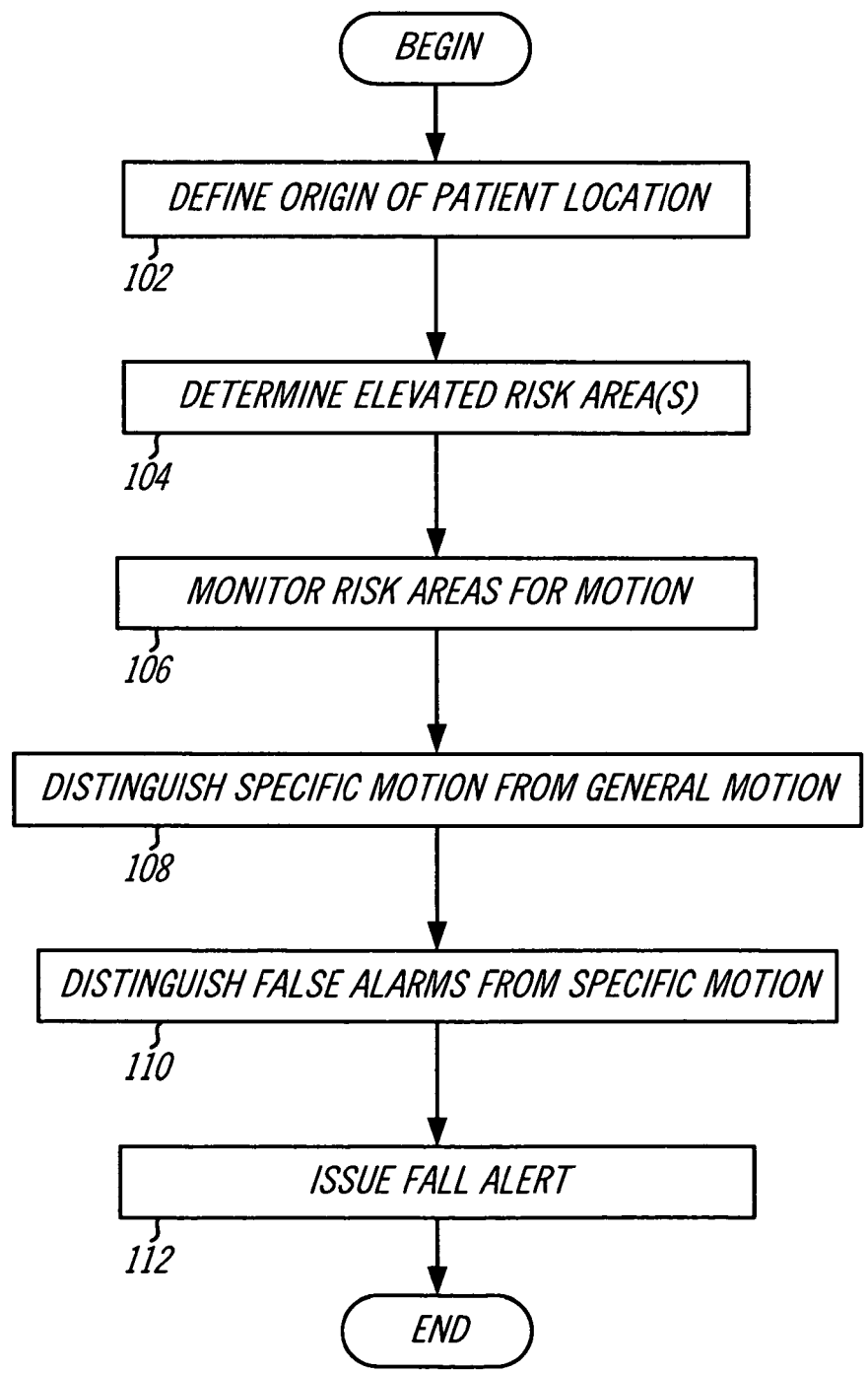
FIG. 1 is a flowchart depicting a generic method for carrying out patient fall predictions in accordance with an exemplary embodiment of the present invention.

Other features of the present invention will be apparent from the accompanying drawings and from the following detailed description.

DETAILED DESCRIPTION OF THE INVENTION

Element Reference Number Designations
200: Patient monitoring system
201: Patient monitoring device
202: Video camera
204: Camera control device
205: Audible alarm
206: Processor
207: Receiver/interrigator
208: Memory (RAM and ROM)
209: Video processor
210: Nurse monitor device
212: Computer (PC, laptop, net device)
214: Display (touch-screen)
216: User interface device (mouse)
220: Patient room
230: Care (Nurse) station
240: Distribution network
321: Bed
322: Wall
324: Night stand
326: Chair
327: Lavatory door
329: Entry door
341: Transmission medium 342: Network switch
343: Boradband connection
345: Patient administration
346: Network server/router/firewall
348: Network system administration
420: Patient room
423: Ceiling
425: Floor
450: Image frame
451: Image frame
460: Orientation angle
461: Orientation angle
622L: Left imaginary fall risk line
622R: Right imaginary fall risk line
630: Bounding screen object
632: Screen pointer
650L: Left motion detection zones
650R: Right motion detection zones
722L: Left imaginary fall risk line
722R: Right imaginary fall risk line
742: Left line object
744: Right line object
750L: Left motion detection zones
750R: Right motion detection zones
800: Viewport
802: Viewport
840: Virtual bedrail
850L: Left motion detection zones
850R: Right motion detection zones
860L: Left motion detection pixel line
860R: Right motion detection pixel line
912: Patient leg
951: Motion detection zone 1
952: Motion detection zone 2
953: Motion detection zone 3
95$n$: Motion detection zone n
1212: Patient leg
1214: Patient arm
1251: Motion detection zone 1
1252: Motion detection zone 2
1253: Motion detection zone 3
125$n$: Motion detection zone n
1261: Column 1
1262: Column 2
1263: Column 3
126$n$: Column n In the following description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following description is, therefore, not to be taken in a limiting sense. For clarity of exposition, like features shown in the accompanying drawings are indicated with like reference numerals and similar features as shown in alternate embodiments in the drawings are indicated with similar reference numerals.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Moreover, the computer readable medium may include a carrier wave or a carrier signal as may be transmitted by a computer server including internets, extranets, intranets, world wide web, ftp location or other service that may broadcast, unicast or otherwise communicate an embodiment of the present invention. The various embodiments of the present invention may be stored together or distributed, either spatially or temporally across one or more devices.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention generally relates to a patient monitoring using captured video image frames of the patient for detecting circumstances in which the patient is at an elevated risk of falling. Video monitoring of patient activity is known, such as described in U.S. patent application Ser. No. 10/735,307 filed Dec. 12, 2003 by Johnson and entitled Non-Intrusive Data Transmission Network for Use in an Enterprise Facility and Method for Implementing. The aforementioned Johnson application also describes detecting patient movements by analyzing sequential frames of video images for changes. A video monitor camera system is installed in the patient's room and aimed at an area of interest in the room, such as at the patient. Sequential image frames are compared for differences that indicate movement. Once detected, the system flags the sequence of images for local storage that can be remotely retrieved at a later time. Furthermore, the Johnson application describes techniques for filtering out unimportant motion in the frame and concentrating on only relevant areas of the image, such as the patient's bed, the area proximate to the patients bed or any other area in the patient's room, thereby saving only the video sequences that are relevant. While these stored video sequences are an important supplement to medical records, the patient monitoring system stores all sequences in which motion is detected without regard to the patient's risk of falling.

One area of particular concern for healthcare facilities is patient falls, particularly from the patient's bed. Typically, a healthcare facility is subdivided into corridors of patient rooms with a centrally located care station (the nurse's station) responsible for a group of rooms. The care station is usually connected to each patient room by at least an intercom system. Each room has a call device that triggers an audible alert at the care station, usually coupled with visual room identification indicia at the care station. Normally, at least one healthcare professional remains in the care station to monitor the patient call system while others go about their routines in and out of patient rooms and other areas of the facility. Patients who should not ambulate without assistance are instructed to call for assistance as they are prone to bed falls, although virtually every patient is at some risk of a bed fall. Patients do not, or sometimes cannot, follow instructions which results in falls and possible injuries. Motion detectors, while helpful in detecting patient movements that might result in a fall, tend to generate a disproportionately high percentage of false alarms. Responding to multiple false alarms tends to desensitize healthcare professionals to the perceived risk of a patient fall. Pressure sensitive pad patient monitors are at the other extreme, that is, they tend to alert only after the patient is in an unsteady state and in the process of falling, such as when the patient's weight shifts from the bed during egress. Once in an unsteady state, it is difficult for a healthcare professional to respond before the patient falls. Patient position sensitive transmission patches alert the professional whenever the part of the patient's body having the pad rotates at a particular angle indicating that the patient is attempting to move into a more vertical position. These systems cannot detect certain critical patient movements that precede a fall, such as a patient rolling off a bed in a generally horizontal attitude or falling backwards from a sitting position off the bed. Furthermore, the latter two devices generally require installing of standalone fall detection equipment.

Recently, the U.S. Congress adopted Public Law No: 110-202 entitled "Keeping Seniors Safe From Falls Act of 2007" for identification, analysis, intervention and rehabilitation of persons at risk of falling. This law may mandate minimal standards for patient fall care and monitoring. What is needed is a patient fall prediction system that detects patient activity in situations indicative of a probable fall and generates an alert prior to the fall event, thereby allowing the healthcare professionals sufficient time to react before the actual fall. Optimally, the system could be incorporated in technology existing in the healthcare facility and should be adaptable for monitoring for patient falls under a variety of conditions.

The present invention is directed to a patient fall prediction system that may be implemented in a facility's existing surveillance monitoring system. FIG. 1 is a flowchart depicting a generic method for carrying out patient fall predictions in accordance with an exemplary embodiment of the present invention. The process begins by determining an area in the viewport frame that will be monitored for patient falls. This area is the origin of patient movement, hence is usually the general location of the patient in the viewport (step 102). Next, the areas around the patient that may be associated with elevated risk for falling are identified in the viewport (step 104). Typically, these areas include hazards such as the edge of a bed or chair, the side of a tub, a shower entry, or even an entryway threshold. Once these areas have been defined in the viewport, the patient fall prediction system monitors them for motion (step 106). One advantage of the present invention is that it does more than merely monitor areas proximate to a patient that may have some inherent risk of falling, instead the fall prediction methodology actually analyses motion with those areas for a specific type of motion that may be a precursor to a patient fall (step 108). Any motions detected in the monitored area that are not precursors to a fall are disregarded. However, even though the system identifies a specific type of motion that always precedes a fall, not all of these motions will result in a patient fall, some are false alarms, which are disregarded (step 110). Only specific motion detected within the monitored area that is a precursor to a fall and is not a false alarm will trigger an actual alarm (step 112).

Briefly, a video camera is securely positioned at a vantage point with an unobstructed view of the patient's area, typically the patient's bed. A healthcare professional views the patient room setting on a monitor, usually remote from the patient, and manually draws a bounding area, or other graphic object, on the screen that defines an area of high risk for patient falls, for instance around a patient's bed. This object is sometimes referred to as a virtual bedrail. The origin of any motion that could be a precursor to a patient fall is located within that object. Once defined, the patient fall prediction system delineates a set of concurrent motion detection zones, in the video viewport, that are adjacent to the risk area. As such, these detection zones are positioned on each risk side of the perimeter of the virtual bedrail. Each set of detection zones comprise several concurrent detections zones that should not overlap. In operation, the fall prediction system monitors each set of motion detection zones for a specific type of motion originating at the origin that would indicate that a patient is at an elevated risk of falling. The system sounds a fall alert at the care station prior to the patient entering a state in which a fall is imminent. General patient movements that are not precursors to a fall are disregarded, as is any other general motion detected in the image not related to the patient. These movements are either: not within the monitored zones; do not originate at the origin; do not traverse the detections zones; or are some combination of the above. Detecting the specific type of motion that is a precursor to a fall is accomplished by analyzing the direction of motion across a set of detection zones. Motion traversing the virtual bedrail from the outside could not be from the patient (or at least is not a precursor movement to a fall) and, therefore, are not predictive of a patient fall. Conversely, specific movements traversing the detection zones from the origin must be a result of a patient movement and a patient fall is always proceeded by such movements. Furthermore, the degree of movement, its position along the virtual bedrail and duration may be scrutinized for more definitive clues suggesting a fall. The present patient fall prediction system may also be combined with a deactivator for temporarily deactivating the fall alert under certain conditions, such as when a healthcare professional is in the patient's room. A more complete understanding of the exemplary embodiments of the present invention is best understood by reference to a description of the accompanying figures.

Figure 2:
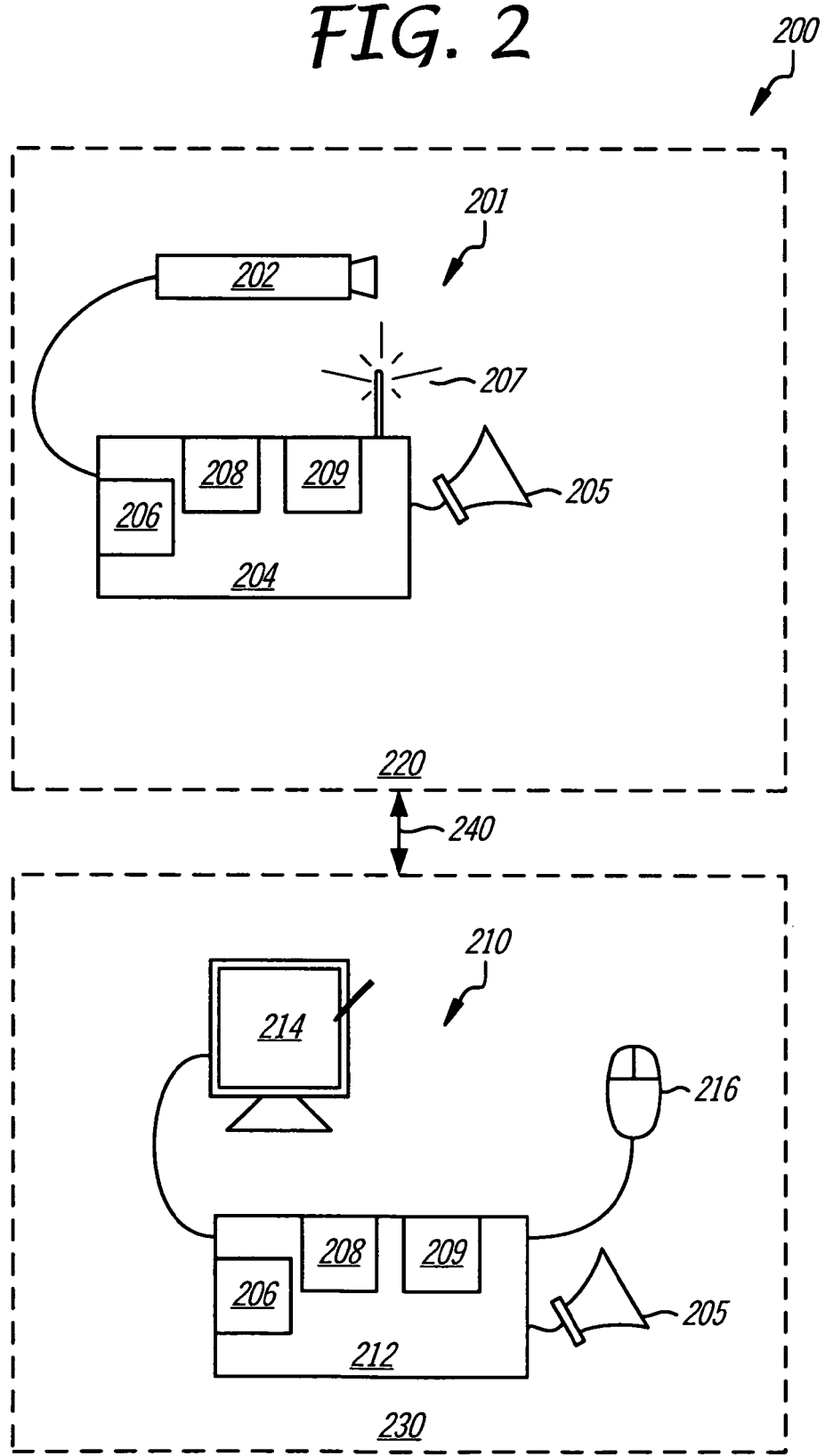
FIG. 2 is a diagram of a patient fall prediction system in accordance with exemplary embodiments of the present invention.

Before discussing the present invention in detail, it should be appreciated that the physical structure of the device may take many forms and operate in a variety of modes without departing from the intended scope of the invention. A brief description of several structural exemplary embodiments is discussed immediately below. FIG. 2 is a diagram of a patient fall prediction system in accordance with exemplary embodiments of the present invention. As depicted in the figure, patient fall prediction system 200 generally comprises patient monitoring device 201 and nurse monitor device 210. Patient monitoring device 201 captures video images of a portion of the patient's room 220 via camera 202, which is coupled to camera control device 204. Camera 202 should be at least of medium quality, produce a stable video output of 300 lines of resolution or greater and have infrared illumination or quasi night vision for operating in extremely low light conditions. Additionally, video camera 202 should have a relatively fast shutter speed to capture relatively fast movements without blurring at frame rates of 20 fps or above. Camera control device 204 processes the video images received from camera 202 in accordance with the novel fall prediction methodology discussed below. As such, camera control device 204 includes processor 206, memory 208 and optional video processor 209. Camera control device 204 may be a special purpose device configured specifically for patient monitoring, such as the set-top control and camera control devices described in the Johnson application identified above or, optionally, may be a generic personal computer (PC). In either case, memory 208 includes both ROM and RAM type as necessary for storing and executing fall prediction program instructions and a high capacity memory, such as a hard drive for storing large sequences of video image frames. Additionally, camera control device 204 may be fitted with a high capacity flash memory for temporarily storing temporal image frames during image processing and/or prior to more permanent storage on a hard drive or at a network location. Optional video processor 209 may be a dedicated image processor under the control of an application routine executing on processor 206, or may be logic operating in processor 206. Under the fall prediction routines, video processor 209 analyzes portions of sequential images for changes in a particular area which correlate to patient movements that are precursors to a fall. Patient monitoring device 201 may be coupled to nurse monitor device 210 located in nurses station 230 via distribution network 240, for transmitting surveillance images of the patient's room and fall state information to nurse monitor device 210. Optionally, audible alarm 205 may be provided for alerting healthcare professionals that camera control device 204 has detected that the patient is at risk of falling. Additionally, camera control device 204 comprises other components as necessary, such as network controllers, a display device and display controllers, user interface, etc.

In many regards, nurse monitor device 210 may be structurally similar to camera control device 204, however its primary functions are to set up the fall prediction routines running at camera control device 204 and to monitor fall state information and surveillance video provided by patient monitoring device 201. Optimally, nurse monitor device 210 is connected to a plurality of patient monitoring devices that are located in each of the patient rooms being monitored at the nurse station. Nurse monitor device 210 generally comprises computer 212 coupled to display 214. Computer 212 may be a personal computer, laptop, net computer, or other net appliance capable of processing the information stream. Computer 212 further comprises processor 206, memory 208 and optional video processor 209, as in camera control device 204, however these components function quite differently. In setup phase, a healthcare professional views the patient room setting and graphically defines areas of high risk for a patient fall, such as the patient bed, chair, shower, tub, toilet or doorways. The graphic object may be manipulated on display 214 by user gestures using resident touch screen capabilities or the user gestures may be entered onto a display space using mouse 216 or other type user interface through a screen pointer (not shown). That information is passed on to patient monitoring device 201 which monitors the selected area for motion predictive of a movement that is a precursor to a patient fall. When patient monitoring device 201 detects that the patient is at high risk of falling, the fall state is immediately transmitted to nurse monitor device 210, which prioritizes the information over any other routine currently running as an alarm. This is accompanied by an audible alarm signal (via audible alarm 205). The healthcare provider can then take immediate response action to prevent a patient fall.

In accordance with other exemplary embodiments of the present invention, patient monitoring device 201 may operate independently, as a self-contained, standalone device. In that case, patient monitoring device 201 should be configured with a display screen and user interface for performing setup tasks. Audible alarm 205 would not be optional. In accordance with still another exemplary embodiment, patient monitoring device 201 may comprise only video camera 202, which is coupled to nurse monitor device 210 at a remote location. In operation, camera 202 transmits a stream of images to nurse monitor device 210 for video processing for fall prediction. It should be appreciated, however, that often high volume traffic on distribution networks, such as sequences of video images, experience lag time between image capture and receipt of the images at the remote location. To avoid undesirable consequences associated with lag, the distribution network bandwidth should be sufficiently wide such that no lag time occurs, or a dedicated video path be created between nurse monitor device 210 and patient monitoring device 201. Often, neither option is practical and therefore, the video processing functionality is located proximate to video camera 202 in order to abate any undesirable lag time associated with transmitting the images to a remote location.

In addition, patient fall prediction system 200 may comprise a deactivator for temporarily disabling the patient fall prediction system under certain conditions. In the course of patient care, healthcare professionals move in and out of patient rooms and in so doing, solicit movements from the patients that might be interpreted as a movement that proceeds a patient fall by the patient fall prediction system. Consequently, many false alarms may be generated by the mere presence of a healthcare professional in the room. One means for reducing the number of false alarms is to temporarily disarm the patient fall prediction system whenever a healthcare professional is in the room with a patient. Optimally, this is achieved through a passive detection subsystem that detects the presence of a healthcare professional in the room, using, for example, RFID or FOB technology. To that end, patient monitoring device 201 will include receiver/interrogator 207 for sensing an RFID tag or FOB transmitter. Once patient monitoring device 201 recognizes a healthcare professional is in the proximity, the patient fall prediction system is temporarily disarmed. The patient fall prediction system will automatically rearm after the healthcare professional has left the room or after a predetermined time period has elapsed. Alternatively, the patient fall prediction system may be disarmed using a manual interface, such as an IR remote (either carried by the healthcare professional or at the patient's bedside) or a dedicate deactivation button, such as at camera control device 204 or in a common location in each of the rooms. In addition to the local disarming mechanisms, the patient fall prediction system may be temporarily disarmed by a healthcare professional at care station 230 using computer 212 prior to entering the patient's room FIG. 3 is a diagram depicting the physical layout and logical topology of a healthcare facility (HCF) as may utilize the present invention. The HCF is typically configured with a plurality of patient rooms 220 and one or more care station 230 statistically located for servicing a predetermined number of rooms in the vicinity. Patient rooms 220 are usually identical in size, design and layout with similar furnishings. An exemplary room will have egress door 329, lavatory door 327 and walls 322 (see FIGS. 4A and 4B discussed below). Furnishings typically include bed 321, night stand 324 and usually one or more chairs 326. In accordance with exemplary embodiments of the present invention, patient room 220 will also include patient monitoring device 201 for monitoring patient movements. Each patient monitoring device 201 is connected to distribution network 240 for sending and receiving programming instructions, video frames, patient fall state information and other types of media and data. As depicted in the figure, distribution network 240 is pervasive across the HCF including patient rooms 220, care station 230, administration sites 345 and network system administrations 348. Distribution network 240 includes a plurality of data paths comprising any type of medium for data transmission. For instance, data transmission medium 341 may be a wired network, e.g., twisted conductor pairs of conductor, coaxial, optical or wireless signals, each using appropriate data transmission equipment and transmission protocols for transmitting data and video images. Distribution network 240 also comprises network switches 342, firewall/servers 346 and computers 212 which may be personal computers, laptops, net computers, or other net appliances capable of processing the information stream, and may be connected to the Internet via high speed line 343. In accordance with one exemplary embodiment of the present invention, computers 212 will be optionally coupled to touch-screen display capable of receiving and echoing user gestures in display space (see nurse monitor device 210).

Figure 4A:
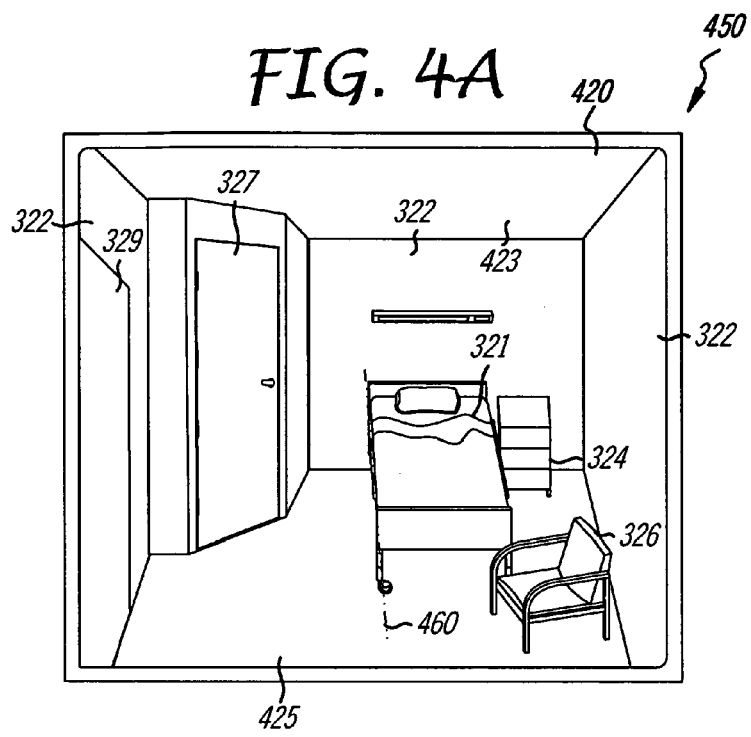
FIGS. 4A and 4B are video viewports 450 and 451 of identical patient rooms 420 as viewed by a healthcare provider on a display at computer 212 in accordance with exemplary embodiments of the present invention.
Figure 4B:
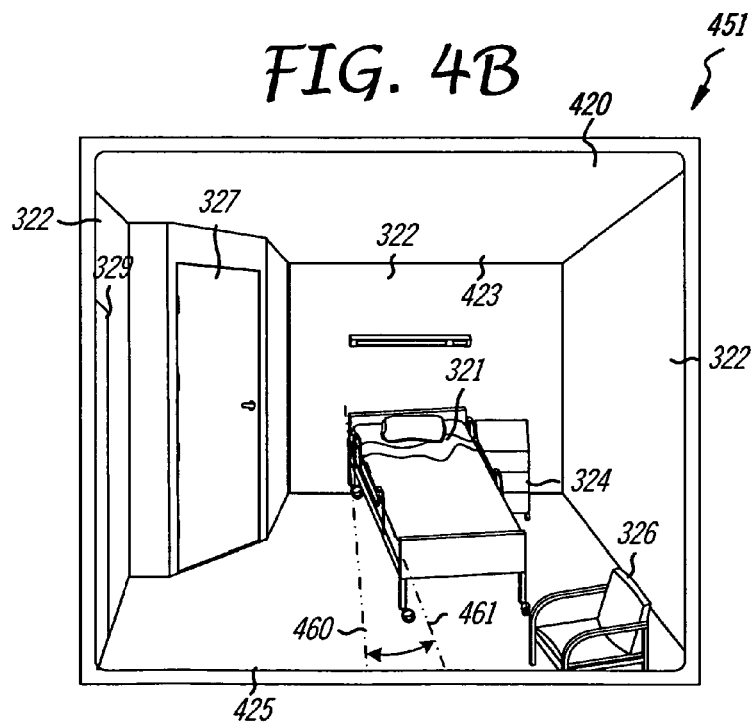

Before discussing the present invention in greater detail, it will be helpful to view a typical patient room from a viewpoint perspective of a video image. FIGS. 4A and 4B are video viewports 450 and 451 of identical patient rooms 420 as viewed by a healthcare provider on a display at computer 212. Within each room can be seen side walls 322, ceiling 423 and floor 425. Along one wall 322 is entry door 329 and bathroom door 327. Each room has identical furnishings: bed 321, night stand 324 and chairs 326. Although the rooms are nearly identical, careful scrutiny of viewports 450 and 451 frames will reveal that the view angle of the cameras in each room are different. More importantly, the orientation angle 460 of bed 321 to the camera in frame 450 has changed in frame 451 to a different orientation, angle 461. Clearly, any patient monitoring system should have the flexibility to adapt to all different room configurations in the HCF.

In operation, patient fall prediction system 200 operates in two modes: setup; patient monitoring. FIG. 5 is a flowchart of a setup method implementing a patient fall prediction system for detecting patient movements that may be precursors to a fall in accordance with an exemplary embodiment of the present invention. The setup procedure is invoked at, for instance, nurse monitor device 210 where a healthcare professional defines a virtual bedrail in display space (step 502). Alternatively, the virtual bedrail may be input using patient monitoring device 201 at the patient's room, as mentioned above. The virtual bedrail defines an area of fall risk for the patient, such as the edge of a bed or chair, or even the toilet, shower or tub. Exemplary mechanisms for defining a virtual bedrail will be discussed with regard to FIGS. 6A through 6D, 7A and 7B. Typically, a virtual bedrail object is displayed in an overlapping position on the image frame at nurse monitor device 210. Next, the nurse monitor device 210 translates that object to input space (step 504). The present method for detecting patient movements may be implemented in any space, i.e., the input space associated with the camera's image sensor (sometimes referred to as a raw image), the display space associated with the display device (sometimes referred to as a raster image) or some other intermediate space. However, operating in input space may be marginally faster because patient monitoring device 201 need not translate the generally rectangular grid of input pixels into a second rectangular grid of raster pixels. More importantly, by making calculation in input space, no additional error introduced from translating the pixels that might reduce the accuracy of the motion detection process. Furthermore, and as mentioned above, it is expected that patient monitoring device 201 will be primarily responsible for motion detection image processing, which operates in input space. Hence, the user defined virtual bedrail object is passed from nurse monitor device 210 to patient monitoring device 201.

Once the virtual bedrail object has been accepted by patient fall prediction system 200, the interior of the virtual bedrail is determined (step 506). It should be appreciated that, since present patient fall prediction system 200 assesses fall risk based on the direction of movement detected between images, the absolute direction of the motion varies with the location of the movement within the image. An origin of the movement is determined from the location of the virtual bedrail on the image. Only motion detected between viewports that signifies movement in a direction away from the origin is of interest. If that movement completely traverses the virtual bedrail, it is recognized by patient fall prediction system 200 as a fall risk movement. With the risk directions determined, the patient fall prediction system creates multiple adjacent motion detection zones adjacent the virtual bedrail (step 508). Typically, the motion detection zones are positioned on the exterior of the virtual bedrail, but may overlap it. The creation of the motion detection zones and their operation will be discussed below, briefly however, risk is assessed across a sequence of images in which movement is detected move through the plurality of detection zones. For instance, a movement signature that is detected in the outermost detection zone, then sequentially in the internal zone(s) and lastly in the innermost zone is consistent with an inward motion that is usually initiated by something other than the patient (i.e., a patient's motion is detected in chronological order from the innermost motion detection zone to the outermost zone). The type of motion does not represent a heightened fall risk state for the patient. Conversely, a movement signature that is detected in the innermost detection zone and then through the internal detection zone(s) and lastly in the outermost zone is consistent with an outward movement of the patient. Every patient bed fall is proceeded by an outward movement signature that traverses a set of detection zones (although not every outward movement signature is followed by a bed fall). Finally, with the sets of detection zones in place, patient fall prediction system 200 proceeds to monitoring mode (step 510).

Figure 6A:
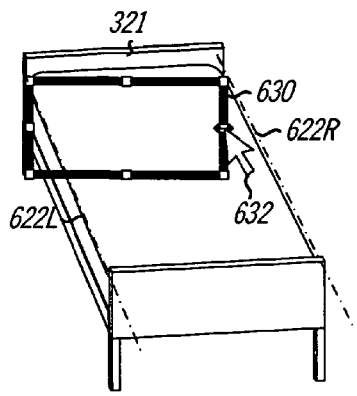
FIGS. 6A-6D depict the bounding box method for defining a virtual bedrail in a display viewport in accordance with an exemplary embodiment of the present invention.
Figure 6B:
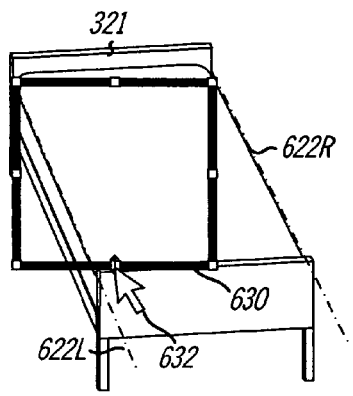
Figure 6C:
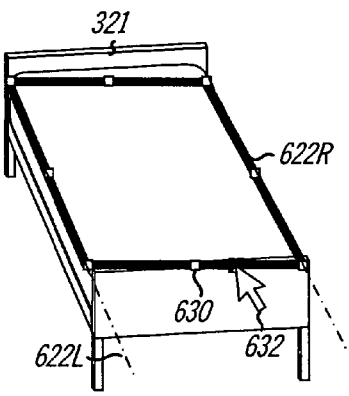
Figure 6D:
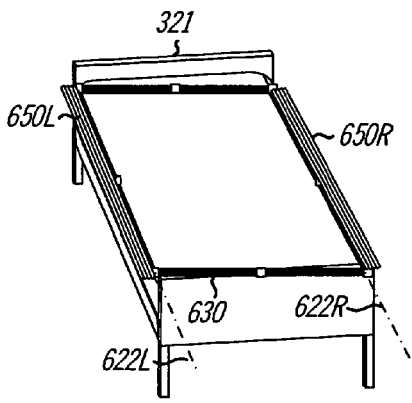
Figure 7A:
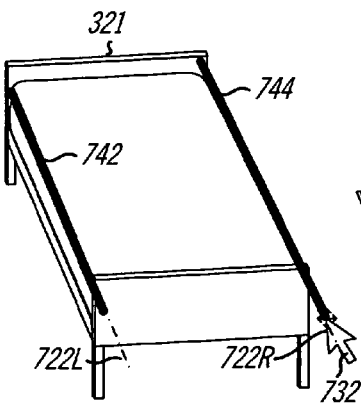
FIGS. 7A and 7B illustrate the line method for defining a virtual bedrail in a display viewport in accordance with another exemplary embodiment of the present invention.
Figure 7B:
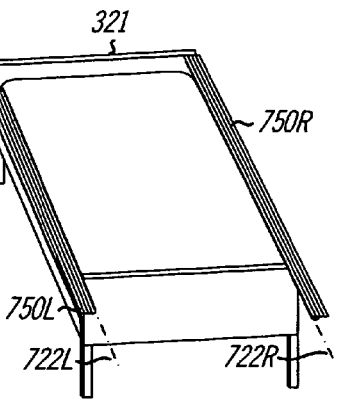

FIGS. 6A-6D, 7A and 7B are diagrams depicting the creation of a virtual bedrail on a display in the setup mode in accordance with exemplary embodiments of the present invention. FIGS. 6A-6D depict the bounding box method and FIGS. 7A and 7B illustrate the line method. Regardless of which method is used, the aim is merely to define the boundary of elevated risk for patient falls. It is expected that in almost every case the patient's bed will not lie square with the display screen, but will be oriented at some angle to it. The bounding box must be manipulated into a corresponding orientation to the bed. With regard to FIGS. 6A-6D, bed 321 is displayed in which two imaginary lines that represent patient fall risk can be envisioned, risk line 622L and risk line 622R. Imaginary risk lines 622L and 622R are represented in the figure merely to emphasize a boundary elevated risk for patient falls, such as the edge of a bed or chair, the side of a tub or shower, or even a doorway or threshold. Imaginary risk lines 622L and 622R are not displayed in image frame to the healthcare professional. The intention is to create a visual bounding box object collinear with the risk lines, wherein motion detection zones will be aligned. Initially, object 630 is opened on the screen, such as by manipulating screen pointer 632 using mouse 216 or other type of user interface device. Object 630 may be invoked on display screen 214 as a drawing object by using an uncomplicated drawing routine. The drawing object must be recognized as a virtual bedrail by patient fall prediction system 200. Alternatively, object 630 may be created by a touch gesture directed across touch screen 214. In FIG. 6A, bounding box object 630 is expanded across the horizontal extent of bed 321 at the headboard. This is typically done by grabbing a side of box object 630 with screen pointer 632. Next, in FIG. 6B bounding box object 630 is expanded across the vertical extent of bed 321 to the footboard. The lower side of box object 630 is then manipulated across the lower portion of bed 321, thereby transforming the rectangle into a rhomboid shape as depicted in FIG. 6C. Notice that the left and right sides are now approximately collinear with risk lines 622L and 622R and the bounding box virtual bedrail is complete. The user can make minor adjustments to box object 630 as necessary. Finally, at least two sets of detection zones are delineated from the lateral sides of box object 630 outward, detection zones 650L and detection zones 650R. The detection zones are automatically created by the patient fall prediction system with box object 630. Optionally, patient fall prediction system 200 may require the user to identify the interior of the object (the origin of movement), by pointing to it, in order to create detection zones 622L and 622R and determine the risk directions. As depicted in the figure, detection zones 622L and 622R are created with respect to the lateral sides of bed 321 and adjacent to imaginary risk lines 622L and 622R. In addition, upper and lower sets of detection zones may be simultaneously created that are adjacent to the upper and lower sides of box object 630. Since these areas have a relatively low fall risk, the upper and lower sets of detection zones are optional.

The drawing operation for creating line objects 742 and 744 depicting in FIGS. 7A and -7B is similar to that described above in FIGS. 6A-6D, however line objects 742 and 744 are directly drawn at imaginary risk lines 722L and 722R. The patient fall prediction system detection delineates the two separate sets of detection zones; detection zones 750L for line object 742 and detection zones 750R for line object 744. It should be appreciated that although in the description of present exemplary embodiment, the virtual bedrail is manually defined on the display area, the present fall prediction system may automatically recognize areas of elevated risk in the image frame and define an appropriate virtual bedrail without human intervention. In that case, the healthcare professional need only confirm the placement of the virtual bedrail and/or modify its size and location as necessary.

It should be mentioned that even though the present invention is described using essentially linear risk lines, these lines may be an virtually shape to accommodate any risk area without departing from the scope of the present invention. For instance, either or both of imaginary risk lines 7221 and 722R may be curvilinear in order to conform to a curved risk surface. Alternatively, the imaginary risk line may form a closed geometric shape, such as a circle or some irregularly geometry. In either case, line objects are drawn in the viewport coextensive with the risk lines associated with the risk area, from which a plurality of detection zones are delineated. The detections zones will then follow the contour of the line drawn object(s) as discussed immediately above.

Detecting motion in the detection zones can be accomplished using a suitable means in monitor mode, for instance, video from video camera 202 is converted to 24 bit RGB frames (red, green and blue values per pixel), at a flexible rate of fps (frames per second) depending on the precision needed, which, for this application, is primarily determined by the distance between video camera 202 and the bed, i.e., the size of the bed/patient in the viewport. Motion detection commences after two frames are buffered, at which time the sets of detection zones, as defined by a viewport of the video, are monitored. A change value is calculated for each detection zone in its viewport. These change values are then compared against an average idle change delta (IDLE_.DELTA., the mean), and an idle range (IDLE_RANGE, the median). If the change value falls outs a range of the IDLE_.DELTA.+/− the IDLE_RANGE, than motion is detected in that detection zone.

More particularly, motion detection is accomplished by taking two subsequent RGB frames and subtracting the RGB values of the new frame from the previous frame for each pixel within the viewport of each motion detection zone, then converting that value to an absolute value (negatives become positives). These values are summed, and then divided by the total number of pixels in the detection zone. The result is a double precision value from 0-1 representing the average pixel change for the detection zone. This value is called the detections zone's MOTION_.DELTA. The MOTION_.DELTA.'s are compared to an IDLE_.DELTA. and idle range which is the representation of the typical average change in pixels when no motion occurs. The IDLE_.DELTA. is a side effect of digital compression of visual data. Whenever a detection zone's MOTION_.DELTA. goes outside the IDLE_.DELTA.+/−IDLE_RANGE, that detection zone is flagged as an active zone being in motion. A detection zone remains "in motion" until the MOTION_.DELTA. returns to within the IDLE_.DELTA.+/−IDLE_RANGE, for a given amount of time, giving it the state of "in motion" a decay effect.

Using the detection methodology has the advantage of being able to readily detect motion regardless of the ambient RGB values from the detection area, because only a change in the relative values is considered. Hence, acceptable values for IDLE_.DELTA. and IDLE_RANGE may be determined in advanced and preset in the system. Alternatively, the values for IDLE_.DELTA. and IDLE_RANGE may be used as defaults, which are updated by the system over time. For instance, under high light conditions, with less color noise, the tolerances for IDLE_.DELTA. and IDLE_RANGE may be relatively low without the possibility of missing a motion event or generating false detections. On the other hand, in conditions where the color noise is higher, such as low light conditions, the tolerances for IDLE_.DELTA. and IDLE_RANGE may be relatively high. For that case, the values for IDLE_.DELTA. and IDLE_RANGE may be somewhat higher to avoid triggering false detections from noise. Consequently, the values for IDLE_.DELTA. and IDLE_RANGE may adaptively updated by the system based on temporal factors, such as lighting conditions, the ambient color and/or luminosity.

Alternatively, motion detection may also be accomplished by down sampling the frames into grayscale images first, then comparing the difference by subtraction, as described above. This method require less processing power, as only one value is calculated, the luminance, however is also less accurate because it is more prone to missing a change of color and intensity as there are fewer representations of color in grayscale than there are combinations of different colors and intensities.

Image compression may also be used for a motion determination mechanism. The separate detection zones are compressed independently in one frame and then compressed again with the same algorithm in the next frame. The difference in sizes of the compressed zones is an indication of motion.

The purpose of creating sets of n detections zones is to aid in distinguishing general movement from a specific movement that is indicative of a high risk movement that precedes a fall. The motion signature of high risk movement is always in an away from the origin or in an outward direction from the virtual bedrail. Hence, the movement signature of the specific motion of interest will proceed from the inner detection zones to the outer detection zone sequentially. However, the geometry of the motion detection zones may vary and be adapted for the particular system employed and for the camera viewpoint. Essentially, the detection zones are groups of pixels from the viewport to be processed by video processor 209. Certain types of pixel configurations are less computationally intensive than others, thereby allowing for a more immediate result. It should be remembered, however, that the viewport is a two-dimensional representation of a three-dimensional area being monitored. Therefore, certain general movements in three-dimensional space of the patient's room can be interpreted as the specific type of movement preceding a fall and trigger a false alarm. Some of these false alarms can be mitigated by narrowing the field of view of the camera and through the placement of the camera, i.e., elevating the position of camera 202 so that pedestrian traffic does not intersect the view path to the detection zones. Others can be circumvented by the configuration of the detection zones.

FIGS. 8A and 8B are diagrams of two possible configurations for motion detection zones in accordance with exemplary embodiments of the present invention. In viewport 800 in FIG. 8A, sets of detection zones 850L and 850R are adjacent to the outward edge of virtual bedrail 840 and comprise zone 1 through n. form the innermost zone to outermost. There should be at least two concurrent zones (i.e., n>1), however the practical upper limit is constrained by processing capacity and the physical dimension of the projection of the zones in the viewport. In other words, the width of detection zones 850, w.sub.1, should be small enough that the patient would traverse all n zones before a fall is imminent, between two and six inches (i.e., 6 in >w.sub.1>2 in). One means to ensure that w.sub.1 is not too large is by relating it to a known dimension, which is problematic since the viewport is dimensionless. Nevertheless, the dimensions of common objects in a healthcare facility are known. For instance, a standard hospital bed is approximately 55 inches wide and since virtual bedrail 840 is drawn with that width, it can be assumed that the width of virtual bedrail 840, w.sub.2 is approximately 55 inches. Therefore, the width of detection zones 850, w.sub.1, can be referenced to the virtual bedrail, i.e., (55/6.times.w.sub.2)>w.sub.1>(55/2.times.w.sub.2), which can be calculated automatically by patient fall prediction system 200. If four zones are desired (i.e., n=4), each zone has a width of 0.25w.sub.1 regardless of how may columns of pixels are contained in each zone.

Alternatively, it may be desired to define each of zones 1-n as having only a single pixel column as depicted in viewport 802 of FIG. 8B. There, n may be significantly larger than four. This configuration is particularly expedient in situations where the sides of bed 321 correlate with columns of pixels in the viewport, i.e., the bed is approximately aligned with the viewport. Then, a motion detection zone is delineated as an entire column of pixels in viewport 802, e.g., sets of zones 860L and 860R. Although defining the detection zones as single columns of pixels may be computationally more expedient, the overlap from virtual bedrail 840 will result in false alarms. Therefore, for detection zones comprising column of pixels, such as is viewport 802, optimally the camera should be posited at an elevated viewpoint and the field of view constrained to bed 321.

Figure 9A:
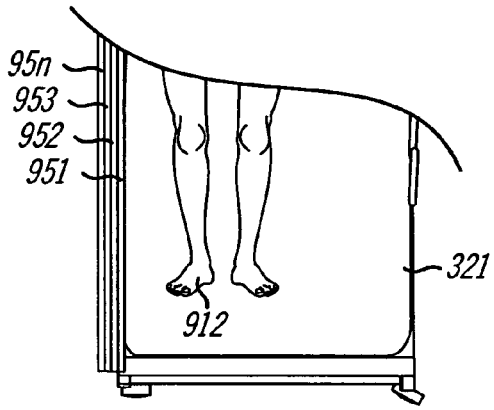
FIGS. 9A-9E graphically represent a response by the detection zones to the type of specific patient movement that may be a precursor to a fall in accordance with one exemplary embodiment of the present invention.
Figure 9B:
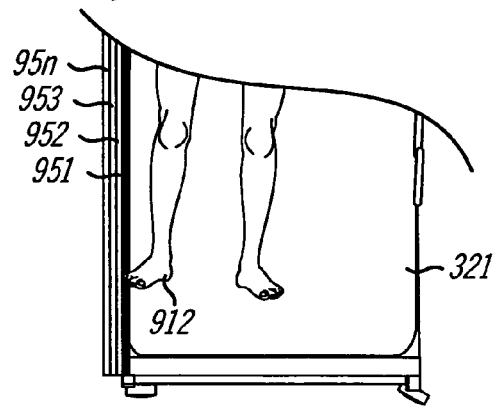
Figure 9C:
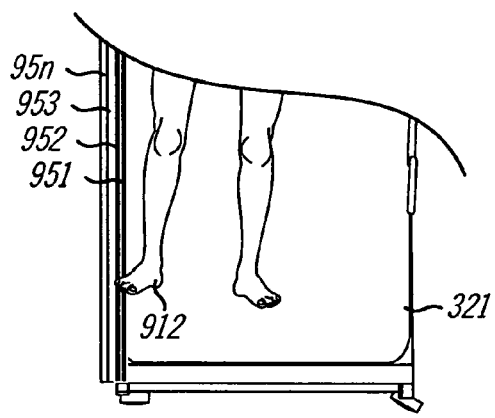
Figure 9D:
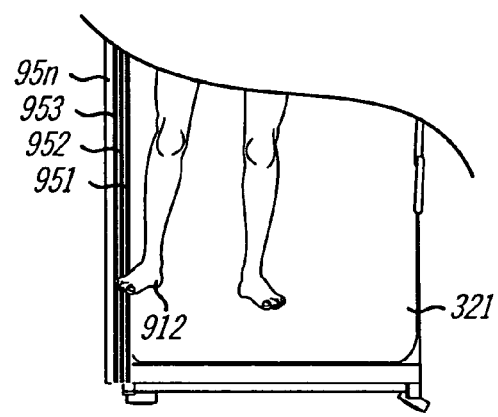
Figure 9E:
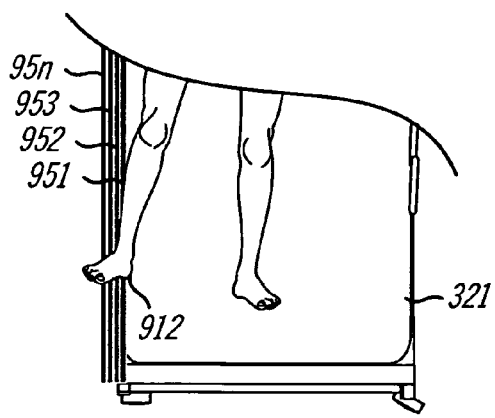

As mentioned above, the motion detection zones are employed as a mechanism for distinguishing a specific type of motion that may be a precursor to a patient fall from more general motion. In accordance with one exemplary embodiment of the present invention, the fall prediction system compares each set of motion detection zones with the corresponding zones from the previous imaged frame for changes and retains the detection order in a separate detection list for each set of zones. The detection list is a list of the detection zones which have experienced changes between the most recent image frames, and in the order that the detections were noticed. The detection list is continually updated with additions and deletions based on new detections and abatements and the detection list is compared to known detection signatures. The detection signature of the specific motion preceding a fall is always from the innermost detection zone, traversing all of the interior zones, to the outermost zone. FIGS. 9A-9E graphically represent a response by the detection zones to the type of specific patient movement that may be a precursor to a fall in accordance with one exemplary embodiment of the present invention. In FIG. 9A-9E the patient is resting in bed 321 with her legs 912 is a recumbent position. Zones 951, 952, 953 through 95n represent zones 1, 2, 3 and n, respectively. As the patient moves from the origin outwardly, motion is detected first in zone 951, represented as shaded (FIG. 9B), then zone 952 (FIG. 9C) and followed by zone 953 (FIG. 9D). Finally, motion is detected in zone 95n (FIG. 9E), resulting in the issuance of a fall alarm. Consequently, and in accordance with one exemplary embodiment of the present invention, the detection signature of interest is: zone 1, zone 2, . . . , zone (n−1), zone n. Movement of healthcare professionals and visitors interacting with the patient will never originate at the origin and, therefore, produce a different detection signature, one of general movement, i.e., zone n, zone (n−1), . . . , zone 2, zone 1. It should be appreciated that although the detection signatures are derived in sequential image frames, the frames are not necessarily consecutive. Assuming a frame rate of 24 fps, it will often require three or more frame movements to completely traverse a one-inch wide detection zone for motion detection to occur in a concurrent zone. Therefore, and in accordance with another exemplary embodiment of the present invention, the prediction system retains the detection list even if no new motion is detected. When motion is detected in a new zone, that zone is added to the detection list, conversely, when motion abates in a detection zone, that zone is deleted from the list. Hence, the list is between 0 and n entries long.

Figure 10:
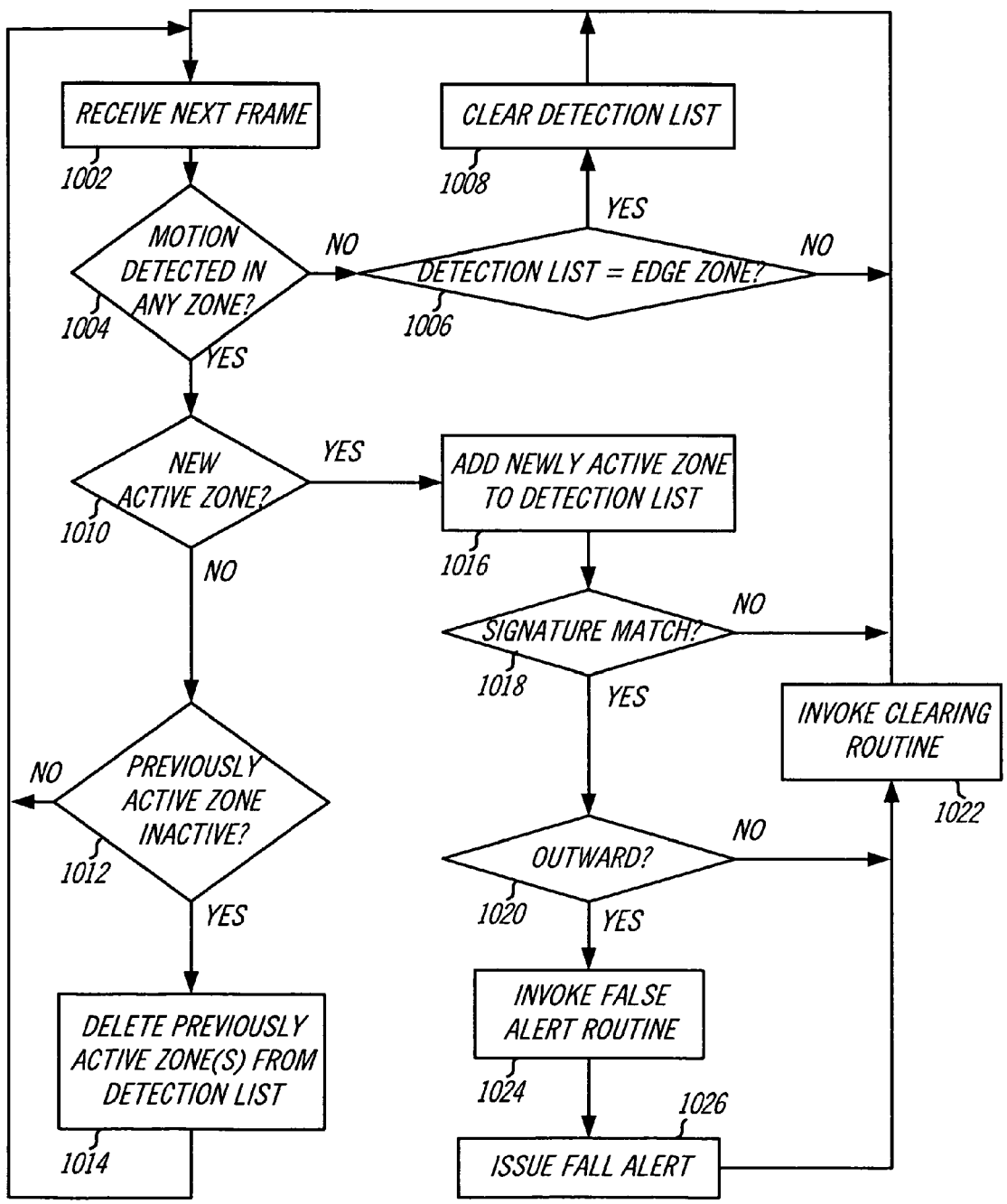
FIG. 10 is a flowchart of a method for accumulating a detection signature using a detection list in accordance with one exemplary embodiment of the present invention.

FIG. 10 is a flowchart of a method for accumulating a detection signature using a detection list in accordance with one exemplary embodiment of the present invention. The process begins by receiving a new image frame (step 1002) and comparing the detection zones of the current image frame with the corresponding detection zones in the previous frame for changes in a manner discussed elsewhere above (step 1004). If no motion is detected, two possible conditions may be present: the movement has left the area of the detection zones; or it has temporarily subsided in the detection zones. If the movement has left the area of the detection zones, then the motion detected in the zones will abate sequentially. Consequently, the inactive zones are deleted from the detection list corresponding with the direction of movement. The only zone that might remain on the list may be an edge zone (either zone 1 or zone n). The list is checked for this condition (step 1006). If the detection list has only one entry, it can be deleted (step 1008), if not, the list is not altered and the next frame is processed (step 1002).

The second condition occurs when a patient moves into some of the detection zones and then stops moving. Incomplete traversals of the detection zones are particularity problematic for reliable matching to a detection signature if the motion is not contiguous. In this situation, the detection list is retained at least initially, (even though the patient is idle and no motion is detected in the current frame) and it reflects the previous state of patient movement. When the patient movement resumes, the motion will be detected simultaneous in all zones on the detection list and the fall predictions system continues to track the patient movement across the detection zones as described below. For example, assume a patient rolls partially off of the bed and comes to rest without falling. As expected, motion is detected sequentially in zones 1 through n−1. Since no motion is detected in zone n, the prerequisite detection signature of a fall is not matched and the fall alarm is not issued. Nevertheless, the detection order is retained for a predetermined time period and the detection list is updated with any new changes detected in the detections zones. The detection list cannot be retained indefinitely, and after some period of idle time it is assumed that the movement has left the detection area and the detection list is cleared. This assumption may be false and the patient may simply be idle, but positioned across one or more detection zones. In order to account for this assumption, the fall prediction system correlates any motion that is detected simultaneous in multiple zones with respect to the most appropriate detection signature based on the most recent zone that motion is detected. With continuing reference with the example above, the detection list is cleared in response to the patient being idle. When the patient continues, the fall prediction system will detect movement in zones 1 through n−1 simultaneously, which does not conclusively match an inward movement or an outward movement detection signature. However, if new motion is then detected in zone n, the fall prediction system will recognize the detection signature as a fall signature because the most recent motion detection is in the outermost zone with all other zones active.

In addition, the present fall prediction system discriminates patient movements that are occasionally detected in the inner zones, zones 1 and 2 and then subsides. Those detection signatures will not trigger a fall alarm unless motion is subsequently detected in all of the zones as described immediately above. Furthermore, the present fall detection methodology distinguishes between non-contemporaneous motion detected from both directions. For instance, patient movement detected in zone 1, zone 2, . . . , and zone (n−1) and later motion detected in zone n from an inward movement, which would seem to match a fall detection signature. However, without zone 1, zone 2, . . . , and zone (n−1) being active when the new motion in zone n is detected, it is assumed that the movement left the area of zones 1 through (n−1) prior to detecting the new motion in zone n.

Returning to FIG. 10, if motion is detected in any one of the zones at step 1004, a check is made to determine if motion is detected in a new zone, i.e., a previously inactive detection zone (step 1010). If not, a check is made to determine if motion in a previously active zone has abated (step 1012). If motion is not detected in a new zone (step 1010) and has not abates in a preciously active detection zone (i.e., the motion currently being detected is in the same zones as in the previous image frame), the process reverts to step 1002 for a new image frame. If, on the other hand, motion has abated in a previously active zone (step 1012), that zone is removed from the detection list (step 1014). Typically, entries that are deleted will appear as the first or last entry on the list. The process then reverts to step 1002 for a new image frame.

Returning to step 1010, if the motion being detected is in a new zone, that zone is now active and is added as the last entry on the detection list (step 1016) and the detection signature is checked against known detection signatures for a match (step 1018). If the current list does not match any known signature (step 1020), the fall prediction system invokes an optional false alert routine to determine more precisely if a fall alert should be issued at this time (step 1024) (the false alert analysis is discussed below with regard to FIGS. 12A and 12B and the false alert routine is described below with regard to FIG. 13). In either case, a fall alert is issued (step 1026). Motion will be continually detected in the zones even after a signature has been matched, which may result in multiple alerts being issued, or may be erroneously matched to other detections signatures by the fall prediction system. To avoid issuing multiple alerts from a single event, once a movement signature is matched, the fall prediction system invokes a clearing routine. The clearing routine (described below with regard to FIG. 11) delays any the issuance of any new alerts until all motion associated with the current fall movement event subsides and prior to continuing the fall prediction process (step 1022). Conversely, if the detection list does not match an outward signature (step 1020), but matches an inward signature, the issuance of a fall alert in not warranted. In that cased the clearing routine is immediately invoked prior to continuing the fall prediction process (step 1022).

The clearing routine is a mechanism that allows all motion associated with a fall movement match to subside prior to continuing the fall prediction routine. Hence, the routine is invoked immediately subsequent to a match. FIG. 11 is a flowchart of a method for clearing a detection list in accordance with one exemplary embodiment of the present invention. A frame count is started (step 1102) and the next frame received (step 1104). The zones are analyzed for motion (step 1106), if detected the process restarts the frame counter (step 1102) and proceeds. If motion is not detected, the frame count is incremented (step 1108), and test for frame number n (step 1110). The aim here is to allow any residual noise in the image to die out prior to resuming the fall prediction routine. Depending on the frame speed, two to ten frames may be checked for changes before resuming the fall prediction routine (i.e. 2≤n≤10) (step 1112). If motion is detected, the process reverts to step 1102, restarts the frame counters and begins again. If no changes are detected within the zones over the n image frames, the detection list is cleared (step 1114) and the motion prediction routine resumed (step 1116).

Figure 12A:
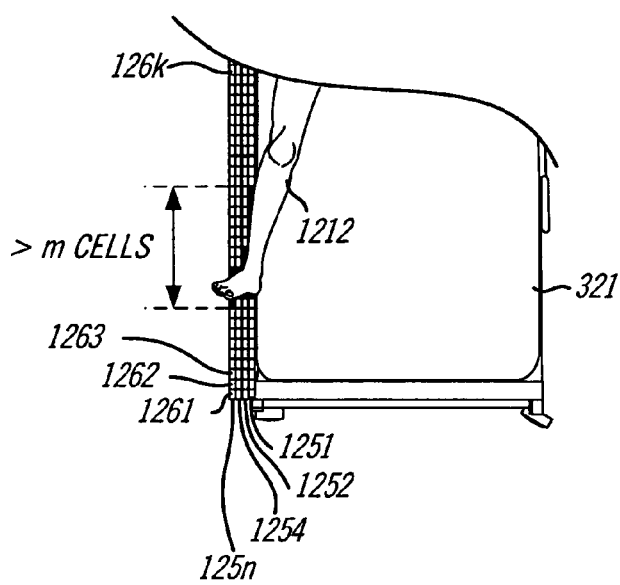
FIGS. 12A and 12B are diagrams that illustrate the distinctions between a patient movement that is a precursor to a fall and a false alert in accordance with one exemplary embodiment of the present invention.
Figure 12B:
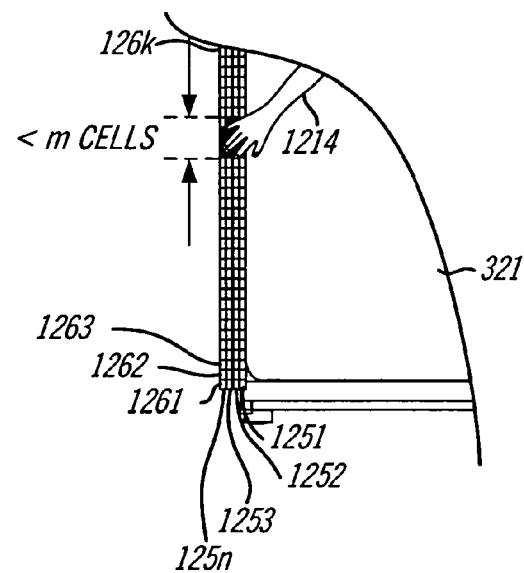

As mentioned above, every patient bed fall is proceeded by an outward movement signature that traverses a set of detection zones although not every outward movement signature is followed by a bed fall. Certain outward patient movement from the origin are not precursors to a fall, such as the patient reaching of an object located on the night stand or tray. Therefore, some detection signature matches to outward movement are false alerts. FIGS. 12A and 12B are diagrams that illustrate the distinctions between a patient movement that is a precursor to a fall and a false alert. FIGS. 12A and 12B each illustrate a typical patient fall movement, wherein patient leg 1212 or patient arm 1214 sequentially traverses all of zones 1 through n (zones 1251, 1252, 1253 and 125n), i.e., the detection list is (zone 1, zone 2, zone 3, zone n). While the movement of leg 1212 across the detection zones is a definite precursor to a fall, the movement of arm 1214 in not necessarily a fall movement. Therefore, the movement depicted in FIG. 12B requires more analysis before issuing a fall alert, several methods are acceptable. In the first, the value for IDLE_RANGE is set high enough to discriminate any small changes in the intensity MOTION_.DELTA. from a smaller object, such as patient arm 1214. Alternatively, one or more of zones 1 through n may be subdivided into k individual cells, cells 126l-126k. Then, subsequent to matching a fall detection signature, the k cells are compared with the k cells in the previous frame for changes. Changes in at least m cells would indicate that the detection signature is a fall signature and not a false alert. The test is reiterated until the motion subsides or a fall signature is indicated.

Figure 13:
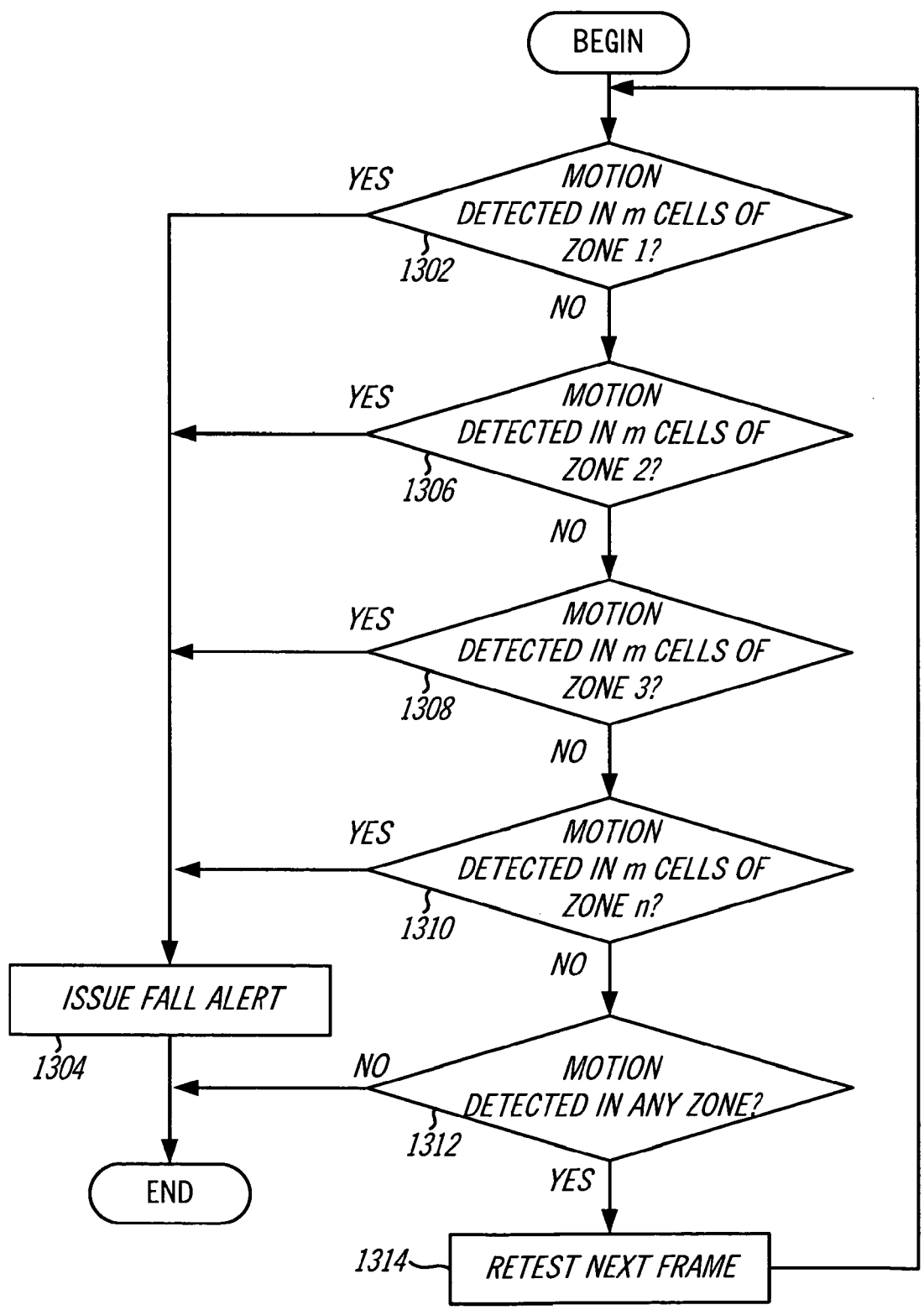
FIG. 13 is a flowchart of a method for discriminating a false alert from a fall alert in accordance with one exemplary embodiment of the present invention.

FIG. 13 is a flowchart of a method for discriminating a false alert from a fall alert in accordance with one exemplary embodiment of the present invention. At least one zone is subdivided into k cells and each of the k cells is compared with the h k cells of the previous image frame for changes. Optimally, the process iterates through all n zones as depicted in the flowchart beginning with the closest zone to the origin, zone 1 (step 1302). If motion is detected in m cells, a fall alert is issued (step 1304). If so the process ends. If not, the process continues to check zone 2 through n (steps 1306, 1308 and 1310) for changes in m cells, if detected a fall alert is issued (step 1304). If not, the process validates that motion was detected in at least one zone (step 1312). The process retests the next image frame (step 1314) and iterates back to step 1302. If no motion is detected in any zone, it is assumed that the movement has left the area of the detection zones and the process ends.

The exemplary embodiments described below were selected and described in order to best explain the principles of the invention and the practical application, and to enable others of ordinary skill in the art to understand the invention for various embodiments with various modifications as are suited to the particular use contemplated. The particular embodiments described below are in no way intended to limit the scope of the present invention as it may be practiced in a variety of variations and environments without departing from the scope and intent of the invention. Thus, the present invention is not intended to be limited to the embodiment shown, but is to be accorded the widest scope consistent with the principles and features described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following is claimed:

1. A surveillance system for detecting an elevated fall risk condition, the system comprising:
   a surveillance camera configured to generate a plurality of frames showing a surveillance viewport of an area including an elevated patient area having a left edge and a right edge opposite the left edge, the left edge and the right edge associated with an elevated risk of patient falls from the elevated patient area; and
   a computer system comprising memory and logic circuitry configured to:
      monitor for motion in each zone of each of a left set of zones and a right set of zones based on the plurality of frames, the zones of the left set of zones located to the left of the left edge and proximate to the left edge, the zones of the right set of zones located to the right of the right edge and proximate to the right edge, each of the left set of zones and the right set of zones respectively comprising at least an inner zone and an outer zone, the inner zone of the left set of zones extending along the left edge, the inner zone of the left set positioned between the left edge and the outer zone of the first set of zones, the inner zone of the right set of

21 zones extending along the right edge, the inner zone of the right set of zones positioned between the right edge and the outer zone of the right set of zones;

detect an inward movement signature indicative of a presence of a healthcare professional proximate the area based on the monitoring for motion, the inward movement signature detected based on motion being detected within the outer zone of the left set or the right set before motion is detected in any other zone of the same set;

initiate a clearing routine based on the detection of the inward movement signature, the clearing routing starting a counter that counts to a predetermined number;

detect an outward movement signature associated with high patient fall risk from the elevated patient area based on the monitoring for motion, the outward movement signature detected based on motion being detected within the inner zone of either of the left set of zones or the right set of zones before motion is detected in any other zone of the same set; and issue a fall alert with the user interface based on the detection of the outward movement signature, the fall alert comprising one or both of a visual indication and an audible indication;

wherein the computer system is configured to refrain from issuing the fall alert while the counter is counting to the predetermined number based on the inward movement indicating the presence of the healthcare professional proximate the area.

2. The system of claim 1, wherein the inner zone and the outer zone of the left set of zones are coextensive with the left edge and the inner zone and the outer zone of the right set of zones are coextensive with the right edge.

3. The system of claim 1, wherein the computer system is configured to monitor for motion by comparing luminance or RGB values of the pixels of each zone with luminance or RGB values of the corresponding zone of a previous frame and calculating a change in value.

4. The system of claim 1, wherein the computer system is configured to detect the outward movement signature based on a chronological order of motion detections that begin with motion in the inner detection zone of one of the left set or the right set and ends with motion in the outer detection zone of the same set.

5. The system of claim 1, wherein each of the left set and the right set respectively comprise at least one detection zone between the inner detection zone and the outer detection zone, and wherein the computer system is configured to detect the outward detection signature within either of the left set or the right set based on motion being detected within the inner detection zone and then being sequentially detected across the at least one detection zone and then being detected within the outer detection zone of the same set.

6. A method for predicting a condition of elevated risk of a fall with a computer system comprising:

receiving a plurality of frames from a surveillance camera showing a surveillance viewport of an area including an elevated patient area having a left edge and a right edge opposite the left edge, the left edge and the right edge associated with an elevated risk of patient falls from the elevated patient area;

monitoring for motion in each zone of each of a left set of zones and the right set of zones based on the plurality of frames, the zones of the left set of zones located to the left of the left edge, the zones of the right set of zones located to the right of the right edge, each of the left set of zones and the right set of zones respectively comprising at least an inner zone and an outer zone, the inner zone of the left set of zones extending along the left edge, the inner zone of the left set positioned between the left edge and the outer zone of the left set of zones, the inner zone of the right set of zones extending along the right edge, the inner zone of the right set of zones positioned between the right edge and the outer zone of the right set of zones;

detecting an inward movement signature indicative of a presence of a healthcare professional proximate the area based on the monitoring, the inward movement signature detected based on motion being detected within the outer zone of the left set or the right set before motion is detected in any other zone of the same set;

initiating a clearing routine based on the detection of the inward movement signature, the clearing routing starting a counter that counts to a predetermined number;

detecting an outward movement signature associated with high patient fall risk from the elevated patient area based on the monitoring, the outward movement signature detected based on motion being detected within the inner zone of either of the left set of zones or the right set of zones before motion is detected in any other zone of the same set; and issuing a fall alert with a user interface based on the detection of the outward movement signature, the fall alert comprising one or both of a visual indication and an audible indication;

wherein the fall alert is not issued if the counter is counting to the predetermined number based on the inward motion indicating the presence of the healthcare professional proximate the area, wherein each of the receiving, monitoring, detecting the inward movement signature, initiating the clearing routine, detecting the outward movement signature, and issuing, are performed by the computer system.

7. The method of claim 6, further comprising detecting an inward movement signature that is not associated with high patient fall risk from the elevated patient area, the inward movement signature detected based on motion being detected within the outer zone of the left set or the right set before motion is detected in any other zone of the same set.

8. The method of claim 7, wherein detecting the presence of the healthcare professional proximate the area comprises detecting the inward movement signature.

9. The method of claim 8, further comprising:

starting a counter based on a detection of the inward movement signature, the counter counting to a predetermined number; and if the counter is counting, clearing the detection of the outward motion signature to refrain from issuing the fall alert.

10. The method of claim 6, wherein the inner zone and the outer zone of the left set of zones are coextensive with the left edge and the inner zone and the outer zone of the right set of zones are coextensive with the right edge.

11. The method of claim 6, wherein monitoring for motion comprises comparing luminance or RGB values of the pixels of each zone with luminance or RGB values of the corresponding zone of a previous frame and calculating a change in value.

12. The method of claim 6, wherein the outward movement signature is detected based on a chronological order of motion detections that begin with motion in the inner detection zone of one of the left set or the right set and ends with motion in the outer detection zone of the same set.

13. The system of claim 6, wherein the each of the left set of zones and the right set of zones respectively comprise at least one detection zone between the inner detection zone and the outer detection zone of each set, and wherein detecting the outward detection signature comprises detecting motion within the inner detection zone and then detecting motion sequentially across the at least one detection zone and then within the outer detection zone of the same set.

14. A surveillance system for detecting an elevated fall risk condition, the system comprising:
- a surveillance camera configured to generate a plurality of frames showing a surveillance viewport of an area including an elevated patient area having a left edge and a right edge, the left edge and the right edge associated with an elevated risk of patient falls from the elevated patient area;
- a user interface; and
- a computer system comprising memory and logic circuitry configured to:
    monitor for motion in each zone of a left set of zones and a right set of zones based on the plurality of frames, the zones of the left set of zones located to the left of the left edge, the zones of the right set of zones located to the right of the right edge, each of the left set of zones and the right set of zones respectively comprising at least an inner zone and an outer zone, the inner zone of the left set of zones extending along the left edge, the inner zone of the left set positioned between the left edge and the outer zone of the first set of zones, the inner zone of the right set of zones extending along the right edge, the inner zone of the right set of zones positioned between the right edge and the outer zone of the right set of zones;
    detect a plurality of movement signatures in one or both of the left set and the right set, the plurality of movement signatures comprising an outward movement signature associated with high patient fall risk from the elevated patient area and an inward movement signature that is not associated with high patient fall risk from the elevated patient area, wherein the outward movement signature is detected based on motion being detected within the inner zone of either of the left set or the right set before motion is detected in any other zone of the same set, and wherein the inward movement signature is detected based on motion being detected within the outer zone of the left set or the right set before motion is detected in any other zone of the same set;
    start a counter based on a detection of the inward movement signature, the counter counting to a predetermined number; and
    issue a fall alert with the user interface based on the detection of the outward movement signature, the fall alert comprising one or both of a visual indication and an audible indication, wherein, if the counter is counting, the computer system is configured to clear the detection of the outward motion signature without issuing the fall alert.

15. The system of claim 14, wherein the computer system is configured to restart the counter if motion is detected in any of the left set of motion detection zones or the right set of motion detection zones during the counting.

16. The system of claim 14, wherein the computer system is configured to:
- detect the outward movement signature based on a chronological order of motion detections that begin with motion in the inner detection zone of one of the left set or the right set and ends with motion in the outer detection zone of the same set; and
- detect the inward movement signature based on a chronological order of motion detections that begin with motion in the outer detection zone of one of the left set or the right set and ends with motion in the inner detection zone of the same set.

\* \* \* \* \*